US008606794B2

(12) United States Patent
Amer-Yahia et al.

(10) Patent No.: US 8,606,794 B2
(45) Date of Patent: *Dec. 10, 2013

(54) **ADAPTIVE PROCESSING OF TOP-*K* QUERIES IN NESTED-STRUCTURE ARBITRARY MARKUP LANGUAGE SUCH AS XML**

(71) Applicant: AT&T Intellectual Property II, L.P., Atlanta, GA (US)

(72) Inventors: Sihem Amer-Yahia, New York, NY (US); Nikolaos Koudas, New York, NY (US); Amelie Marian-Guerrier, New York, NY (US); Divesh Srivastava, Summit, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/783,999

(22) Filed: Mar. 4, 2013

(65) Prior Publication Data

US 2013/0275407 A1    Oct. 17, 2013

Related U.S. Application Data

(63) Continuation of application No. 11/073,966, filed on Mar. 7, 2005, now Pat. No. 8,412,714.

(60) Provisional application No. 60/629,994, filed on Nov. 22, 2004.

(51) Int. Cl.
*G06F 7/00*    (2006.01)

(52) U.S. Cl.
USPC ............ 707/748; 707/714; 707/723; 707/769

(58) Field of Classification Search
None
See application file for complete search history.

(56) References Cited

U.S. PATENT DOCUMENTS

| | | | |
|---|---|---|---|
| 6,615,209 B1 | 9/2003 | Gomes et al. | |
| 6,654,734 B1 | 11/2003 | Mani et al. | |
| 6,766,330 B1 | 7/2004 | Chen et al. | |
| 6,917,932 B2 | 7/2005 | Chang et al. | |
| 7,099,620 B2 | 8/2006 | Miller | |
| 7,177,859 B2 | 2/2007 | Pather et al. | |
| 7,185,012 B1 | 2/2007 | Koudas et al. | |

(Continued)

OTHER PUBLICATIONS

Dongwon Lee, Query Relaxation for XML Model, Jun. 2002, University of California, Los Angeles, Ph.D Dissertation, p. 1-181.

(Continued)

*Primary Examiner* — Mohammad S Rostami
(74) *Attorney, Agent, or Firm* — Wolff & Samson, PC

(57) ABSTRACT

A method of adaptively evaluating a top-k query involves (1204) forming a servers having respective server queues storing candidate answers, processing (1322) the candidate answers, and (1232) providing a top-k set as a query evaluation. Processing includes (1402) adaptively choosing a winning server to whose queue a current candidate answer should be sent; (1404) sending the current candidate answer to the winning server's queue; (1334) adaptively choosing a next candidate answer to process from the winning server's queue; (1336) computing a join between the current candidate answer and next candidate answers at the winning server, so as to produce a new current candidate answer; and (1338) updating the top-k set with the new current candidate answer only if a score of the new current candidate answer exceeds a score of a top-k answer in a top-k set. A method of calculating scores for candidate answers is also provided.

20 Claims, 12 Drawing Sheets

(56) References Cited

U.S. PATENT DOCUMENTS

| | | | |
|---|---|---|---|
| 7,225,187 | B2 | 5/2007 | Dumais et al. |
| 7,251,648 | B2 | 7/2007 | Chaudhuri et al. |
| 7,254,580 | B1 | 8/2007 | Gharachorloo et al. |
| 7,664,749 | B1 | 2/2010 | Koudas et al. |
| 7,698,267 | B2 | 4/2010 | Papakonstantinou et al. |
| 7,730,060 | B2 | 6/2010 | Chakrabarti et al. |
| 2002/0156772 | A1 | 10/2002 | Chau et al. |
| 2003/0014405 | A1 | 1/2003 | Shapiro et al. |
| 2003/0041047 | A1 | 2/2003 | Chang et al. |
| 2003/0101169 | A1 | 5/2003 | Bhatt et al. |
| 2003/0208484 | A1 | 11/2003 | Chang et al. |
| 2004/0068486 | A1 | 4/2004 | Chidlovskii |
| 2004/0098384 | A1 | 5/2004 | Min et al. |
| 2004/0158580 | A1 | 8/2004 | Carmel et al. |
| 2004/0205082 | A1 | 10/2004 | Fontoura et al. |
| 2005/0050016 | A1 | 3/2005 | Stanoi et al. |
| 2005/0223026 | A1 | 10/2005 | Chaudhuri et al. |
| 2005/0289102 | A1 | 12/2005 | Das et al. |

OTHER PUBLICATIONS

TF-IDF, http://en.wikipedia.org/wiki/Tf-idf>, retrieved on Jan. 28, 2008; 1 page.

European Patent Office Search Report for Corresponding European Patent Application No. 07122148.5-1527; Feb. 15, 2008; pp. 1-4.

Al-Khalifa, S., et al., "Querying Structured Text in an XML Database", Proc. of the 2003 ACM SIGMOND Int'l Conf. on Mgmnt. of Data, Jun. 9, 2003, San Diego, CA, pp. 4-15.

Amer-Yahia, S., et al., "FleXpath: Flexible Structure and Full-Text Querying for XML", Proceedings of the 2004 ACM SIGMOND Int'l Conference on Management of Data-Session: Research Sessions: Web, XML and IR, Jun. 13, 2004, pp. 83-94.

Amer-Yahia, S., et al., "Tree Pattern Relaxation", Advances in Database Tech.—EDBT 2002, 8th Int'l Conf. on Extending Database Tech., vol. 2287, 2002, Germany, pp. 496-513.

Avnur, R., et al., Eddies: Continuously Adaptive Query Processing, SIGMOND Record AM USA, vol. 29, No. 2, Jun. 2000, pp. 261-272.

Carmel, D., et al., "Searching XML Documents Via XML Fragments", SIGIR Forum (ACM Special Interest Group on Inform. Retrieval) Jul. 28, 2003, Toronto, Canada, pp. 151-158.

Kaushik, R., et al., "On the Integration of Structure Indexes and Inverted Lists", Proc. of the 2004 ACM SIGMOND Int'l Conf. on Mgmnt. of Data, Jun. 16, 2004, France, 12 pgs.

Marian, A., et al., "Adaptive Processing of Top-k Queries in XML", Proceeding of the 21st Int'l Conference on Data Engineering, Apr. 5, 2005, pp. 162-173.

Marian, A., et al., "Evaluating Top-k Queries Over Web-Accessible Databases", ACM Transactions on Database Systems ACM USA, vol. 29, No. 2, Jun. 2004, pp. 319-362.

Natsev, A., et al., "Supporting Incremental join Queries on Ranked Inputs", Proceedings of the 27th Int'l Conference on Very Large Data Bases, Sep. 11, 2001, pp. 281-290.

Schlieder, T., et al., "Querying and Ranking XML Documents", Journal of the American Society for Inform. Science & tech., USA, vol. 53, No. 6, 2002, pp. 489-503.

Wolff, J., et al., "Searching and Browsing Collections of Structural Information", IEEE Proceedings—Advances in Digital libraries, Washington, DC May 22-24, 2000, pp. 141-150.

Eurpoean Patent Office Search Report for Corresponding European Patent Application 05270034.1-1527; May 4, 2007; pp. 1-17.

ADAPTIVE PROCESSING OF TOP-K QUERIES IN NESTED-STRUCTURE ARBITRARY MARKUP LANGUAGE SUCH AS XML

CROSS-REFERENCE TO RELATED APPLICATION

This application is a continuation of prior application Ser. No. 11/073,966, filed Mar. 7, 2005 which is a non-provisional application of prior Provisional Application No. 60/629,994, filed Nov. 22, 2004, the disclosures of which are herein incorporated by reference in their entirety.

BACKGROUND

1. Field of the Invention

The invention generally relates to arrangements for processing top-k queries. More particularly, the invention relates to arrangements for adaptively processing top-k queries on XML-type documents—that is, documents having nested-structure, arbitrary (document-specific) markup.

2. Related Art

The ability to compute top-k answers to extensible markup language (XML) queries is gaining importance due to the increasing number of large XML repositories. {Ref 1}. Top-k query evaluation on exact answers is appropriate when the answer set is large and users are only interested in the highest-quality matches. Top-k queries on approximate answers are appropriate on structurally heterogeneous data (e.g., querying books from different online sellers). In both cases, an XPath query may have a large number of answers, and returning all answers to the user may not be desirable. One of the prominent querying approaches in this case is the top-k approach that limits the cardinality of answers by returning k answers with the highest scores.

The efficiency of top-k query evaluation relies on using intermediate answer scores in order to prune irrelevant matches as early as possible in the evaluation process. In this context, evaluating the same execution plan for all matches leads to a lockstep style processing which might be too rigid for efficient query processing. At any time in the evaluation, answers have gone through exactly the same number and sequence of operations, which limits how fast the scores of the best answers can grow. Therefore, adaptive query processing that permits different partial matches to go through different plans is more appropriate.

Adaptivity in query processing has been utilized before {Refs 1, 4, 12, 25} in order to cope with the unavailability of data sources and varying data arrival rates, by reordering joins in a query plan. However, there is a need to use adaptive techniques for efficiently computing exact and approximate answers to top-k queries in XML.

U.S. Patent Application Publication No. 2002/0156772 (Chau et al.) disclose several methods for retrieving XML documents, many of which relate to storing documents in columns in a table.

U.S. Patent Application Publication No. 2003/0101169 (Bhatt et al.) discloses a method for extracting, transforming, and persistently storing data that is in Extensible Markup Language ("XML") format.

U.S. Patent Application Publication No. 2003/0208484 (Chang et al.) discloses a method of dynamic optimization of queries using methods that perform on-the-fly optimizations based on cost predictions to reduce overall response time.

U.S. Patent Application Publication No. 2004/0098384 (Min et al.) discloses a method of processing a query for XML data having an irregular structure using an Adaptive Path indEX for XML data (APEX), which is said to improve query processing performance by extracting frequently used paths from path expressions having been used as queries for XML data, and updating the APEX using the frequently used paths.

U.S. Patent Application Publication No. 2004/0205082 (Fontoura et al.) discloses querying a stream of XML data in a single pass using standard XQuery/XPath expressions.

U.S. Pat. No. 6,654,734 (Mani et al.) discloses retrieving XML documents using schema (Document Type Definitions) for query processing and optimization.

U.S. Pat. No. 6,766,330 (Chen et al.) discloses methods to query and access XML documents while guaranteeing that the query outputs conform to the document type definition (DTD) designated by the user.

Thus, there is still a need to use adaptive techniques for efficiently computing exact and approximate answers to top-k queries in XML.

BACKGROUND TECHNICAL REFERENCES

All are Incorporated Herein by Reference

{Ref 1} D. Abadi, D. Carney, U. Cetinternel, M. Cherniack, C. Convey, S. Lee, M. Stonebraker, N. Tatbul and S. Zdonik Aurora: A New Model and Architecture for Data Stream Management. *VLDB Journal* 2003, 120-139.

{Ref 2} S. Amer-Yahia, S. Cho, D. Srivastava. Tree pattern relaxation. *EDBT* 2002.

{Ref 3} S. Amer-Yahia, L. Lakshmanan, S. Pandit. FleXPath: Flexible Structure and Full-Text Querying for XML. *SIGMOD* 2004.

{Ref 4} R. Avnur, J. Hellerstein. Eddies: Continuously Adaptive Query Processing. *SIGMOD* 2000.

{Ref 5} N. Bruno, S. Chaudhuri, L. Gravano. Top-k Selection Queries Over Relational Databases: Mapping Strategies and Performance Evaluation. *ACM Transactions on Database Systems (TODS)*, 27(2), 2002.

{Ref 6} M. J. Carey, D. Kossmann. On Saying "Enough Already!" in SQL. SIGMOD 1997.

{Ref 7} K. C.-C. Chang, S.-W. Hwang. Minimal Probing: Supporting Expensive Predicates for Top-k Queries. *SIGMOD* 2002.

{Ref 8} C. Chen, Y. Ling. A Sampling-Based Estimator for Top-k Query. *ICDE* 2002.

{Ref 9} T. T. Chinenyanga, N. Kushmerick. Expressive and Efficient Ranked Querying of XML Data. *WebDB* 2001.

{Ref 10} E. Damiani, N. Lavarini, S. Marrara, B. Oliboni, D. Pasini, L. Tanca, G. Viviani The APPROXML Tool Demonstration. *EDBT* 2002.

{Ref 11} C. Delobel, M. C. Rousset. A Uniform Approach for Querying Large Tree-structured Data through a Mediated Schema. *International Workshop on Foundations of Models for Information Integration (FMII—2001)*. Viterbo, Italy.

{Ref 12} A. Deshphande. An Initial Study of the Overheads of Eddies. *SIG-MOD Record* February 2004.

{Ref 13} R. Fagin, A. Lotem, M. Naor. Optimal Aggregation Algorithms for Middleware. *PODS* 2001.

{Ref 14} R. Fagin. Combining Fuzzy Information from Multiple Systems. *PODS* 1996.

{Ref 15} N. Fuhr, K. Grossjohann XIRQL: An Extension of XQL for Information Retrieval. *ACM SIGIR Workshop on XML and Information Retrieval*. Athens, Greece, 2000.

{Ref 16} V. Hristidis, N. Koudas, Y. Papakonstantinou. PREFER: A system for the Efficient Execution Of Multiparametric Ranked Queries. *SIG-MOD* 2001.

{Ref 17} I. F. Ilyas, W. G. Aref, A. K. Elmagarmid. Supporting Top-k Join Queries in Relational Databases. *VLDB* 2003.

{Ref 18} Y. Kanza, Y. Sagiv. Flexible Queries over Semistructured Data. *PODS* 2001.

{Ref 19} R. Kaushik, R. Krishnamurthy, J. Naughton and R. Ramakrishnan. On the Integration of Structure Indices and Inverted Lists. *SIGMOD* 2004.

{Ref 20} A. Marian, N. Bruno, L. Gravano. Evaluating Top-k Queries over Web-Accessible Databases. *ACM Transactions on Database Systems (TODS)*, 29(2), 2004.

{Ref 21} A. Natsev, Y. Chang, J. R. Smith, C. Li, J. S. Vitter. Supporting Incremental Join Queries on Ranked Inputs. *VLDB* 2001.

{Ref 22} G. Salton and M. McGill. *Introduction to Modern Information Retrieval*. McGraw-Hill, 1983

{Ref 23} T. Schlieder. Schema-driven evaluation of approximate tree-pattern queries. *EDBT* 2002.

{Ref 24} A. Theobald, G. Weikum. The index-based XXL search engine for querying XML data with relevance ranking. *EDBT* 2002.

{Ref 25} T. Urhan and M. Franklin. Cost-Based Query Scrambling for Initial Query Delays *SIGMOD* 1998, 130-141.

SUMMARY

A method of adaptively evaluating a top-k query involves forming a servers having respective server queues storing candidate answers, processing the candidate answers, and providing a top-k set as a query evaluation. Processing may include adaptively choosing a winning server to whose queue a current candidate answer should be sent; sending the current candidate answer to the winning server's queue; adaptively choosing a next candidate answer to process from the winning server's queue; computing a join between the current candidate answer and next candidate answers at the winning server, so as to produce a new current candidate answer; and updating the top-k set with the new current candidate answer only if a score of the new current candidate answer exceeds a score of a top-k answer in a top-k set. A method of calculating scores for candidate answers is also provided.

BRIEF DESCRIPTION OF THE DRAWINGS

A more complete appreciation of the described embodiments is better understood by reference to the following Detailed Description considered in connection with the accompanying drawings, in which like reference numerals refer to identical or corresponding parts throughout, and in which.

DETAILED DESCRIPTION

Figure 1A:
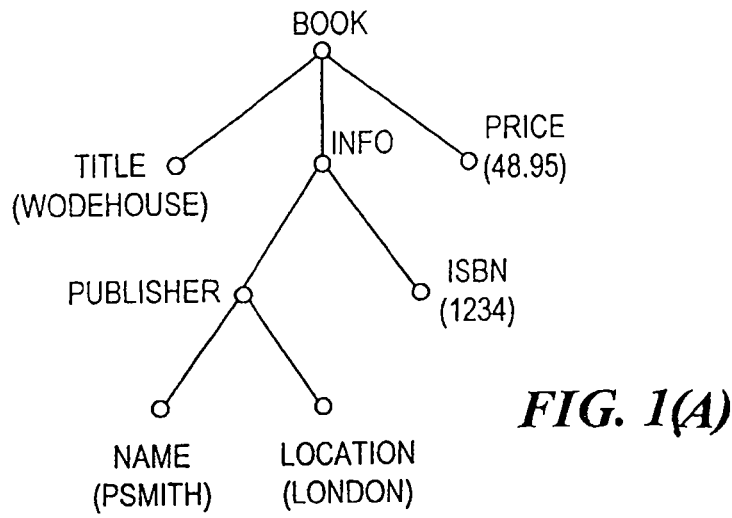
FIGS. 1(A) through 1(C) (collectively, "FIG. 1") show a heterogeneous XML database example.

In describing embodiments illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose. Various terms that are used in this specification are to be given their broadest reasonable interpretation when used to interpret the claims.

Moreover, features and procedures whose implementations are well known to those skilled in the art are omitted for brevity. For example, initiation and termination of loops, and the corresponding incrementing and testing of loop variables, may be only briefly mentioned or illustrated, their details being easily surmised by skilled artisans. Thus, the steps involved in methods described herein may be readily implemented by those skilled in the art without undue experimentation.

Further, various aspects, features and embodiments of the presence indication arrangement may be described as a process that can be depicted as a flowchart, a flow diagram, a structure diagram, or a block diagram. Although a flowchart may describe the operations as a sequential process, many of the operations can be performed in parallel, concurrently, or in a different order than that described. Operations not needed or desired for a particular implementation may be omitted. A process or steps thereof may correspond to a method, a function, a procedure, a subroutine, a subprogram, and so forth, or any combination thereof.

As noted in the Background, the ability to compute top-k matches to XML queries is gaining importance due to the increasing number of large XML repositories. The efficiency of top-k query evaluation relies on using scores to prune irrelevant answers as early as possible in the evaluation process. In this context, evaluating the same query plan for all answers might be too rigid because, at any time in the evaluation, answers have gone through the same number and sequence of operations, which limits the speed at which scores grow. Therefore, adaptive query processing that permits different plans for different partial matches and maximizes the best scores is more appropriate.

This disclosure presents an architecture and adaptive methods for efficiently computing top-k matches to XML queries. The disclosed methods can be used to evaluate both exact and approximate matches, where "approximation" is defined by relaxing XPath axes. In order to compute the scores of query answers, the traditional tf*idf measure is extended to account for document structure.

Extensive experiments on a variety of benchmark data and queries demonstrate the usefulness of the adaptive approach for computing top-k queries in XML. Thus, the invention provides adaptive techniques for efficiently computing exact and approximate answers to top-k queries in XML.

As a background to understanding the embodiments described herein, the following definitions and examples are provided, with the understanding that the scope of the claims should not be limited thereby.

XML: as used in this specification, Extensible Markup Language (XML) is meant to denote, not a specific version of an industry standard, but rather any markup language that supports nested structures and document-specific markup. That is, context tags (including semantic tags such as <sponsor> and document structure tags such as <paragraph>) and annotations may be nested within each other; tags may be uniquely defined for each document, as distinguished from, for example, HTML's set of universally recognized tags.

Text: characters that constitute the content of a document; character sets may be of any language (Roman, Latin, Japanese, Arabic, and so forth).

Tag: a command inserted in a document that specifies how the document or portion thereof should be formatted or how its structure or meaning should be interpreted. Tags generally come in pairs: opening and closing tags that delimit a fragment of the document. In XML, unlike HTML, tags may be user defined and document-specific, such as <sponsor> . . . </sponsor>; such tags (including context tags) may be nested.

Markup: characters and symbols (such as tags) that describe or give context to text that is associated with the markup (usually between opening and closing tags).

Element: constitutes an opening tag, a corresponding closing tag, and intervening items. In XML, elements may be nested.

Context: an element that is given a particular name. Context includes "structural" tags like <paragraph> . . . </paragraph> or <chapter> . . . </chapter> that reflect structural relations within a document; context also includes "semantic" tags like <sponsor> . . . </sponsor> that express a higher level meaning of the tagged contents.

Document order: the sequential order of index numbers. In one embodiment, the order is contiguous. A first tag or word "precedes" a second tag or word in document order, if the index number of the first tag or word is less than the index number of the second tag or word.

Relaxed query: a query obtained by applying one or many relaxations to the user query. By definition, the user query is also a relaxed query.

Partial answer: a query answer that matches part of the query.

Complete answer: a query answer that matches all of the query.

Exact answer: a complete answer that matches the user query.

Approximate answer: a partial or complete answer that matches a relaxed form of the user query.

Candidate answer: a partial or complete answer to a query.

1. Introduction

In order to compute approximate matches of XPath queries, we adopt a query relaxation framework defined in {Ref 3}, where relaxations such as the ones proposed by {Refs. 2, 11, 23} can be encoded in the query plan in order to permit structurally heterogeneous answers to match the original query in addition to exact answers.

Choosing the best k query matches is based on computing answer scores. Scoring query candidate answers in the context of XML needs to account for two key aspects:

(i) a candidate answer to an XPath query may be any fragment of the input document, and (ii) an XPath query consists of several predicates linking the returned node to other query nodes, instead of simply "keyword containment in the document".

Existing efforts in Information Retrieval (IR) such as {Refs 15, 24} have focused on extending the tf*idf (term frequency and inverse document frequency) measure to return document fragments. The present invention extends the tf*idf measure to account for scoring on both structure and content predicates and return document fragments.

The novel architecture disclosed herein incorporates a family of methods for processing top-k queries on XML documents adaptively. The methods compute both exact and approximate matches. It is adaptive in permitting partial matches to the same query to follow different execution plans, taking the top-k nature of the problem into account. In certain embodiments:

a partial match that is highly likely to end up in the top-k set is processed in a prioritized manner, and a partial match unlikely to be in the top-k set follows the cheapest plan that enables its early pruning.

Also disclosed is a novel scoring function for XML, inspired by tf*idf.

The strategy is implemented for a variety of routing alternatives (i.e., which operation does a partial match go through next?), and prioritization alternatives (i.e., given a number of partial matches waiting for a specific operation, how to prioritize them?), to obtain a family of adaptive evaluation methods.

Also described is a prototype embodying the disclosed architecture and methods. A detailed experimental evaluation of the present disclosed methods was performed on a variety of benchmark data sets and queries. This evaluation identified the tradeoffs between the different routing and prioritization alternatives among embodiments of the disclosed methods, demonstrated that adaptivity pays off in processing top-k queries, and validated the disclosed scoring function.

Thus, the present disclosed methods embody per-answer adaptive evaluation strategies for computing top-k candidate answers to XML queries. The following disclosure contains:

a motivating example for relaxation and adaptivity (§2), a summary of related work (§3), a description of a new scoring function (§4), a detailed description of embodiments of the architecture and methods (§5), and results of extensive experiments (§6).

2. Motivating Example.

First, a motivating example is presented, focusing on various concepts such as relaxation and adaptivity.

Relaxation.

Consider a data model for XML where information is represented as a forest of node labeled trees. A simple database instance, containing a heterogeneous collection of books, is given in FIG. 1. Represent XML queries as tree patterns, an expressive subset of XPath. FIG. 2 contains examples of XPath queries and their corresponding tree pattern. A tree pattern is a rooted tree where nodes are labeled by element tags, leaf nodes are labeled by tags and values and edges are XPath axes (e.g., pc for parent-child, ad for ancestor-descendant). The root of the tree (shown as a solid circle) represents the returned node.

Figure 1B:
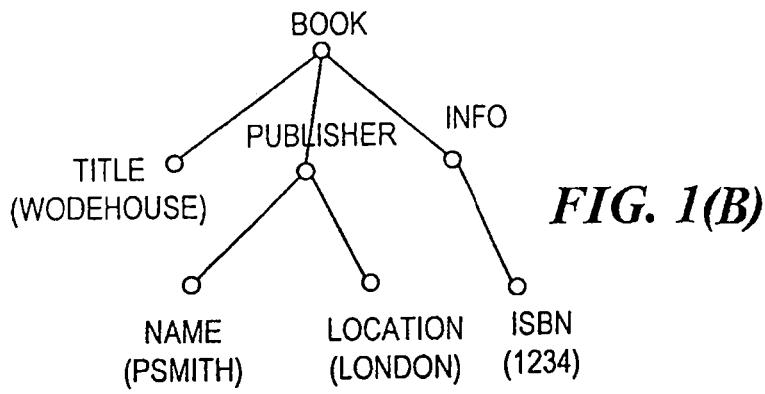
Figure 1C:
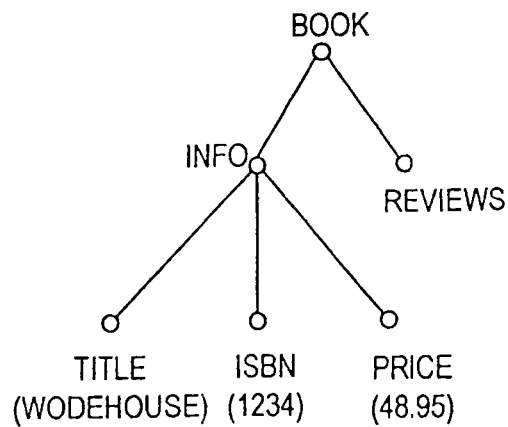

Different queries would match different books in FIG. 1. For example, the query in FIG. 2(A) would match book 1(A) exactly, but would neither match book 1(B) (since publisher is not a child of info) nor book 1(C) (since the title is a descendant, not a child, of book, and the publisher information is entirely missing). However, intuitively, it makes sense to return all three books as candidate matches, suitably ranked based on the extent of similarity of the books to the query in FIG. 2(A).

In order to allow for such approximate candidate answers, adopt query relaxation as defined in {Refs 2, 11, 23} and formalized in {Ref 3}. The method uses three specific relaxations (or any composition of these relaxations):
  edge generalization (replacing a pc edge with ad),
  leaf deletion (making a leaf node optional), and
  subtree promotion (moving a subtree from its parent node to its grandparent).

These relaxations capture approximate candidate answers but still guarantee that exact matches to the original query continue to be matches to the relaxed query. For example, the query in FIG. 2(B) can be obtained from the query in FIG. 2(A) by applying edge generalization to the edge between book and title. The query in FIG. 2(C) is obtained from the query in FIG. 2(C) by composing subtree promotion (applied to the subtree rooted at publisher) followed by leaf deletion applied to info, and edge generalization applied to the edge between book and title. Finally, the query in FIG. 2(D) is obtained from the query in FIG. 2(C) by applying leaf deletion on name then on publisher.

Figure 2A:
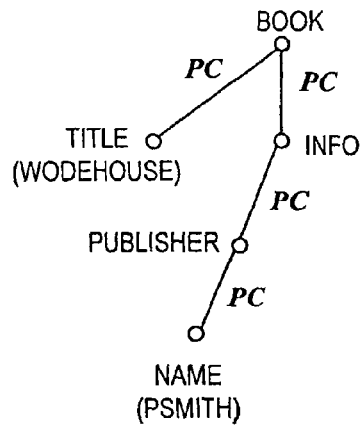
FIGS. 2(A) through 2(D) (collectively, "FIG. 2") show various query tree patterns and relaxations.
Figure 2B:
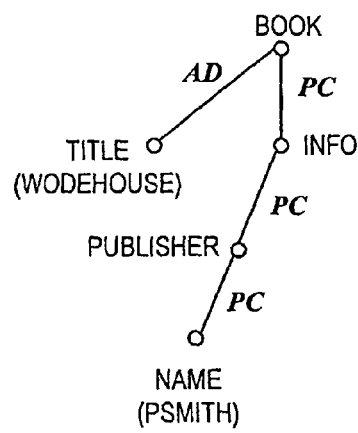
Figure 2C:
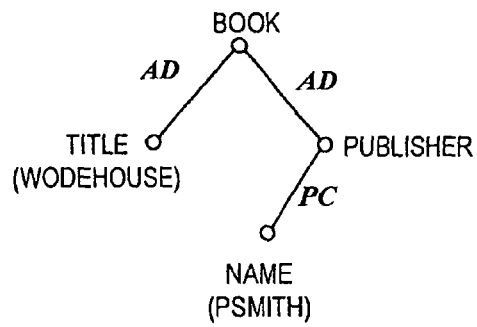
Figure 2D:
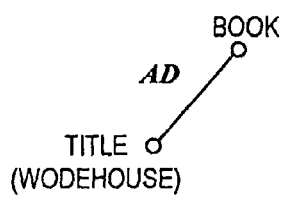

As a result, while the queries in FIGS. 2(A) and 2(B) match the book in FIG. 1(a) only, the query in FIG. 2(C) matches both book in FIG. 1(a) and the book in FIG. 1 (b) and the query in FIG. 2(D) matches all three books.

Exact matches to a relaxed query are the desired approximate candidate answers to the original user query. In order to distinguish between different candidate answers, one needs to compute scores that account for query relaxation, as described below with reference to the scoring function. For now, assume that scores are given and motivate the need for adaptive query processing.

Adaptivity

Suppose now that we are interested in evaluating a query that looks for the top-1 book with a title, a location and a price, all as children elements. Obviously, without applying query relaxation, this query would be empty if it is evaluated on the three books in FIG. 1. Similar to {Ref 2}, the method uses a left-deep outer-join plan that encodes edge generalizations in the query. Leaf nodes in the plan are query nodes and join predicates correspond to pc and ad edges in the query tree. Evaluating the query on the book collection enhanced with an additional book (d) having three exact matches for title, each one of them with a score equal to 0.3, five approximate matches for location where approximate scores are 0.3, 0.2, 0.1, 0.1, and 0.1. These scores are associated with the corresponding join predicate. Each book generates multiple tuples in the join plan (one for each combination of book, title, location and price). Thus, the score of a tuple is the sum of the individual predicate scores.

For simplicity, focus only on the computation of tuples for book 1(D). During the evaluation of book 1(D), some tuples may be pruned based on their scores and the score of the current kth best candidate answer (currentTopK). This value depends on the values of previously computed tuples. Therefore, the number of pruned tuples at each step depends on previously computed tuples.

Figure 3:
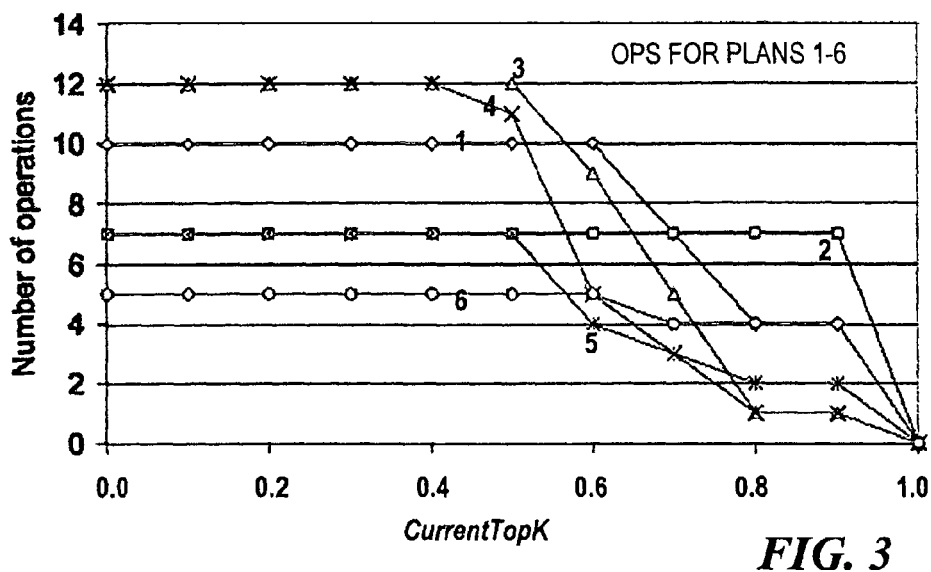
FIG. 3 shows an example of adaptivity.

Consider six join plans that correspond to all permutations of title, location and price assuming that the root node book is always evaluated first. FIG. 3 shows the performance of each plan with increasing values of currentTopK. The performance is measured in terms of the total number of join operations (i.e., join predicate comparisons). FIG. 3 shows that no plan is the best (even with a small number of generated tuples-15 tuples in this example).

When currentTopK<0.6, the best plan is Plan 6 (join book with price then with title then with location). However, when 0.6≤currentTopK≤0.7, the best plan is Plan 5 (join book with price then location then title). Finally, when currentTopK>0.7, Plans 4 (join book with location then price then title) and 3 (join book with location then title then price) are both best.

Interestingly, Plans 3 and 4 are by far the worst if currentTopK<0.5, but become the best later on, and Plan 6 becomes bad for higher values of currentTopK. Intuitively, joining book with location first creates the largest number of intermediate tuples (5), which is why Plans 3 and 4 are bad for low values of currentTopK. However, since location has only approximate matches, when currentTopK is high, the tuples generated from the join with location can be pruned faster, leading to fewer alive intermediate tuples.

Since the value of currentTopK changes during query evaluation, static join ordering (akin to selectivity-based optimization) would not be optimal. Query evaluation should dynamically decide which join predicate to consider next for a given tuple based on the value of currentTopK using adaptive query processing.

3. Related Work (not Admitted to be "Prior Art")

Several query evaluation strategies have been proposed for XPath. Prominent among them are approaches that extend binary join plans, and rely on a combination of index retrieval and join methods using specific structural (XPath axes) predicates {Ref 19}. This disclosure adopts a similar approach for computing exact query answers.

Several query relaxation strategies have been proposed before. In the context of graphs, Kanza and Sagiv {Ref 18} proposed mapping query paths to database paths, so long as the database path includes all the labels of the query path; the inclusion need not be contiguous or in the same order which bears some similarities to edge generalization with subtree promotion. Rewriting strategies {Refs 9, 11, 15, 23} enumerate possible queries derived by transformation of the initial query. Data-relaxation {Ref 10} computes a closure of the document graph by inserting shortcut edges between each pair of nodes in the same path and evaluating queries on this closure. Plan-relaxation {Ref 2} encodes relaxations in a single binary join plan (the same as the one used for exact query evaluation). This encoding relies on (i) using outer joins instead of inner-joins in the plan (e.g., to encode leaf deletion), and (ii) using an ordered list of predicates (e.g., if not child, then descendant) to be checked, instead of checking just a single predicate, at each outer-join. Outer join plans were shown to be more efficient than rewriting-based ones (even when multi-query evaluation techniques were used), due to the exponential number of relaxed queries {Refs 2, 3}. This disclosure uses outer join plans for computing approximate matches.

In relational databases, existing work has focused on extending the evaluation of SQL queries for top-k processing. None of these works follows an adaptive query evaluation strategy. Carey and Kossmann {Ref 6} optimize top-k queries when the scoring is done through a traditional SQL order-by clause, by limiting the cardinality of intermediate results. Other works {Refs 5, 8, 16} use statistical information to map top-k queries into selection predicates which may require restarting query evaluation when the number of answers is less than k.

Over multiple repositories in a mediator setting, Fagin et al. propose a family of methods {Refs 13, 14}, which can evaluate top-k queries that involve several independent "subsystems," each producing scores that are combined using arbitrary monotonic aggregation functions. These methods are sequential in that they completely "process" one tuple before moving to the next tuple.

The Upper {Ref 20} and MPro {Ref 7} methods show that interleaving probes on tuples results in substantial savings in execution time. In addition, Upper {Ref 20} uses an adaptive pertuple probe scheduling strategy, which results in additional savings in execution time when probing time dominates query execution time. These techniques differ from the present approach in that all information on a tuple is retrieved through a unique tuple ID, whereas the present approach's operations are outer-joins that spawn one or more result tuples. Chang and Hwang {Ref 7} suggested an extension to MPro that evaluates joins as Cartesian products, thus requiring to process a potentially huge number of tuples. In contrast, the present model allows for evaluation of all results of a join at once.

Top-k query evaluation methods over arbitrary joins have been presented for multimedia applications {Ref 21} and relational databases {Ref 17} but their ranking function combines individual tuple scores, whereas, in our scenario, the score of a top-k candidate answer depends on the join predicate (e.g., child or descendant) used to produce the XPath approximate match (Section 4). Thus, a given node participates differently to the final score of the approximate candidate answers it is joined with, depending on how good a match it is. In addition, existing top-k join methods require join inputs to be sorted, which is not the case in our setup.

Recently {Ref 19}, top-k keyword queries for XML have been studied via proposals extending the work of Fagin et al. {Refs 13, 14} to deal with a bag of single path queries. Adaptivity and approximation of XML queries are not addressed in this work. Finally, in {Ref 2}, the goal was to identify all candidate answers whose score exceeds a certain threshold (instead of top-k answers). Early pruning was performed using branch-and-bound techniques. The authors explored a lockstep adaptive processing for relaxed XML queries while the present disclosure explores adaptivity on a per-answer basis.

While this idea of adaptive evaluation is similar to {Ref 4}, the present disclosure uses adaptivity in the context of exact and approximate XML queries and focuses on issues such as exploring different routing strategies (Section on Experimental Evaluation, below) that are appropriate when pruning intermediate query answers for top-k evaluation.

4. Scoring Function

The traditional tf*idf function is defined in information retrieval (IR), on keyword queries against a document collection. This function takes into account two factors:

(i) idf, or inverse document frequency, quantifies the relative importance of an individual keyword (i.e., query component) in the collection of documents (i.e., candidate answers); and (ii) tf, or term frequency, quantifies the relative importance of a keyword (i.e., query component) in an individual document (i.e., candidate answer).

In the vector space model in IR {Ref 22}, query keywords are assumed to be independent of each other, and the tf*idf contribution of each keyword is added to compute the final score of the answer document.

In this disclosure, a conservative extension of the tf*idf function to XPath queries against XML documents is presented. A first point to note is that, unlike traditional IR, an answer to an XPath query need not be an entire document, but can be any node in a document. A second point is that an XPath query consists of several predicates linking the returned node to other query nodes, instead of simply "keyword containment in the document" (as in IR). Thus, the XML analogs of idf and tf would need to take these two points into consideration.

Existing efforts in IR {Refs 15, 24} have focused on extending tf*idf to return document fragments (instead of whole documents). In {Ref 24}, the authors consider the use of semantic ontologies to compute scores on content predicates. This work focuses on a scoring method that combines predicates on both structure and content.

Definition 4.1. XPath Component Predicates.

Consider an XPath query Q, with $q_o$ denoting the query answer node, and $q_i$, $1 \leq i \leq l$, denoting the other query nodes. Let $p(q_o, q_i)$ denote the XPath axis between query nodes $q_o$ and $q_i, i \geq 1$. Then, the component predicates of Q, denoted $P_Q$, is the set of predicates $\{p(q_o, q_i)\}$, $1 \leq i \leq l$.

For example, the component predicates of the XPath query /a[./b and ./c[.//d and following-sibling:: e]] is the set:

{a [parent::doc-root], a [./b], a [./c], a [.//d], a [./e]}

The component predicates provide a unique decomposition of the query into a set of "atomic predicates". This is akin to decomposing a keyword query in IR. into a set of individual "keyword containment predicates".

Definition 4.2. XML idf.

Given an XPath query component predicate $p(q_o, q_i)$ and an XML database D, p's idf against D, $idf(p(q_o, q_i), D)$, is given by:

$$\log\left(\frac{|\{n \in D : \text{tag}(n) = q_0\}|}{|n \in D : \text{tag}(n) = q_0 \,\&\, (\exists\, n' \in D : \text{tag}(n') = q_i \,\&\, (n, n'))|}\right)$$

Intuitively, the idf of an XPath component predicate quantifies the extent to which qo nodes in the database D additionally satisfy $p(q_o, q_i)$. The fewer $q_o$ nodes that satisfy predicate $p(q_o, q_i)$, the larger is the idf of $p(q_o, q_i)$. This is akin to the case in IR.: the fewer the documents that contain keyword $k_i$, the larger is $k_i$'s idf.

Definition 4.3. XML tf.

Given an XPath query component predicate $p(q_o, q_i)$, and a node n∈D with tag $q_o$, p's tf against node n, $tf(p(q_o, q_i), n)$, is given by:

$$|\{n' \in D : \text{tag}(n') = q_i \,\&\, p(n, n')\}|$$

Intuitively, the tf of an XPath component predicate p against a candidate answer n∈D quantifies the number of distinct ways in which n satisfies predicate p. This is again akin to the case in IR.: the more the number of occurrences of keyword $k_i$ in a document $d_j$, the larger is the term frequency of $k_i$ in $d_j$.

Definition 4.4. XML tf*idf Score.

Given an XPath query Q, let $P_Q$ denote Q's set of component predicates. Given an XML database D, let N denote the set of nodes in D that are answers to Q. Then the score of answer n∈N is given by:

$$\Sigma_{p_i \in P_Q}(idf(p_i,D)*tf(p_i,n))$$

Note that, in defining the tf*idf score of an XPath query answer, we closely followed the vector space model of IR in assuming independence of the query component predicates. A key advantage of this approach is the ability to compute this score in an incremental fashion during query evaluation. More sophisticated (and complex) scores are possible if the independence assumption is relaxed, as in probabilistic IR models {Ref 22}.

As defined, different exact answers to an XPath query may also end up with different scores. This is no different from the IR case of having different documents that contain each of the query keywords having different scores. Once XPath query relaxations are permitted, an approximate answer to the original query Q is simply an exact answer to a relaxed query Q' of Q. Thus, the present invention's tf*idf mechanism suffices to score approximate answers to Q as well.

5. "Method 1" (see pseudocode box, below)

We first describe the overall Method 1 architecture and then present adaptive top-k processing methods.

5.1. Architecture

Intuitively, the Method 1 approach is an evaluation strategy of controlled chaos, which is extremely effective in cheaply and quickly identifying the top-k answers to relaxed XPath queries. The "chaos" is a consequence of permitting the possibility of different evaluation plans for different partial matches; this is in sharp contrast to the lockstep approach, where each partial match goes through the same sequence of operations. The "control" comes from making cost-based decisions, instead of choosing random evaluation plans.

Figure 4:
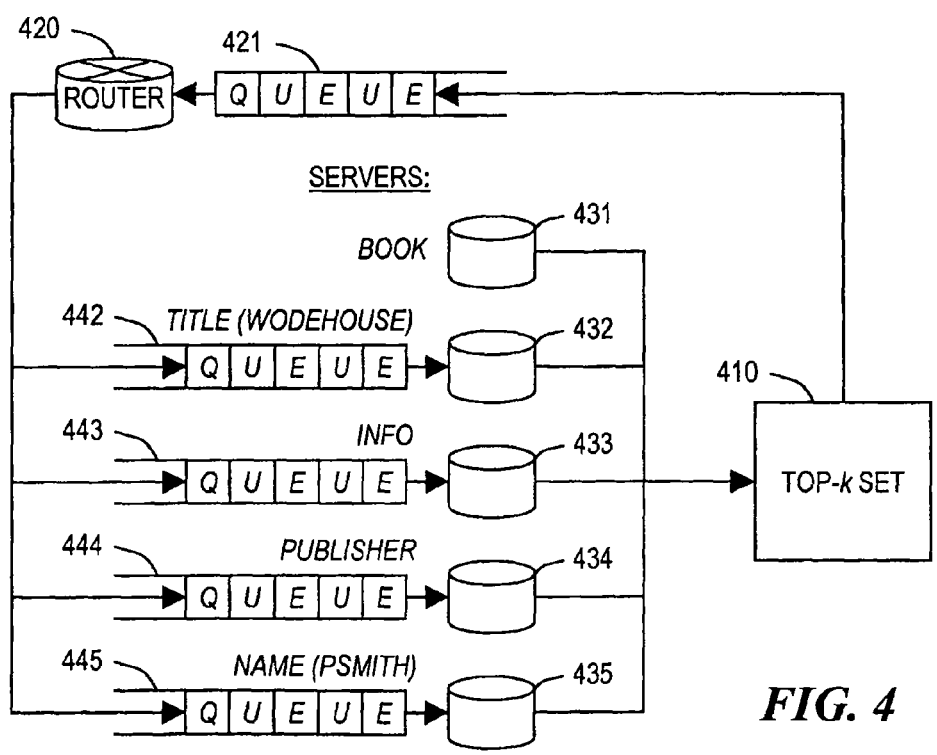
FIG. 4 illustrates an embodiment of the architecture for performing top-k queries of XML documents adaptively.

The components of one embodiment of the Method 1 architecture are depicted in FIG. 4, specialized for the XPath query in FIG. 2(A) and its relaxations. These components include:

Servers and Server Queues.

At the heart of adaptive query evaluation are servers, one for each node in the XPath tree pattern. FIG. 4 depicts five servers with query node labels. The book server includes a processing portion 431; the title server includes a processing portion 432 and queue 442; the info server includes a processing portion 433 and queue 443; the publisher server includes a processing portion 434 and queue 444; and the name server includes a processing portion 435 and queue 445.

One of these servers, the book server, is special in that it generates candidate matches to the root of the XPath query, which initializes the set of partial matches that are adaptively routed through the system.

Each of the other servers (e.g., the publisher server) maintains a priority queue 442, 443, 444, 445 of partial matches (none of which have previously gone through this server). For each partial match at the head of its priority queue, each processing portion 432, 433, 434, 435 performs operations including:

(i) computing a set of extended (partial or complete) matches, each of which extends the partial match with a publisher node (if any) that is consistent with the structure of the queries,
(ii) computing scores for each of the extended matches,
(iii) determining if the extended match influences or is influenced by the top-k set.

Top-k Set.

Referring again to FIG. 4, the system maintains a candidate set 410 of top-k (partial or complete) matches, along with their scores, as the basis for determining if a newly computed partial match:

(i) updates the score of an existing match in the set, or
(ii) replaces an existing match in the set, or
(iii) is pruned, and hence not considered further.

Only one match with a given root node is present in the top-k set as the k returned answers must be distinct instantiations of the query root node. Matches that are complete are not processed further, whereas partial matches that are not pruned are sent to the router.

Router and Router Queue.

Referring again to FIG. 4, the matches generated from each of the servers, and not pruned after comparison with the top-k set, are sent to a router 420, which maintains a router queue 421 based on the maximum possible final scores of the partial matches (Section 6.1.3) over its input. For the partial match at the head of its queue, router 420 makes the determination of the next server that needs to process the partial match, and sends the partial match to that server's queue (442, 443, 444, or 445).

The top-k answers to the XPath query, along with their scores, are known when there are no more partial matches in any of the server queues, the router queue, or being compared against the top-k set.

5.2. Methods

We first describe how each server processes its input and then, we explain the overall top-k query processing.

5.2.1. Server Query Processing. Each server handles two distinct sources of complexity, namely, query relaxations and adaptive query processing.

Query Relaxations.

A consequence of permitting XPath query relaxations is that the predicates at a server can involve a variety of nodes.

For example, given the query in FIG. 2(A), and its Method 1 architecture of FIG. 4, the server corresponding to publisher needs to check predicates of the form pc (info, publisher) and pc (publisher, name) for the exact query. Supporting edge generalization on the edges (info, publisher) and (publisher, name) would require checking for the predicates ad(info, publisher) and ad(publisher name). Allowing for subtree promotion on the subtree rooted at publisher would require checking for the predicate ad(book, publisher). Finally, the possibility of leaf node deletions means that the predicate comparing publisher with name is optional.

---

Method 1

Require: Query Q, k
1:    relaxedQ = relax(Q);
2:    Create one server per node in relaxedQ;
3:    rootN = rootNode(relaxedQ);
4:    routerQueue = evaluate(rootN);
5:    servers = nonRootNodes(relaxedQ);
6:    for each server S in servers do
7:        queueAtS = evaluate(S);
8:        serverQueues += queueAtS;
9:    end for
10:   while (nonEmpty(routerQueue)OR(nonEmpty(serverQueues))) do
11:       answer = nextAnswer(routerQueue);
12:       sendToNextServer(answer);
13:       for each server S in servers do
14:           answerAtS = nextAnswerAtS(queueAtS);
15:           computeJoinAtS(answerAtS);
16:           checkTopK(topKSet,answerAtS);
17:           if aliveAtS(topKSet,answerAtS) then -continued Method 1

```
18:         backToRouter(answerAtS);
19:         serverQueues -= answerAtS;
20:       end if
21:     end for
22:   end while
23:   return topKSet
```

Adaptive Query Processing.

Static evaluation strategies guarantee that all partial matches that arrive at a server have gone through exactly the same server operations. With adaptive strategies, different partial matches may have gone through different sets of server operations, and hence may have different subsets of query nodes instantiated.

For example, given the query in FIG. 2(A), partial matches arriving at the publisher server may have previously gone through any of the other servers; only the node corresponding to the query root is guaranteed to be present. Dealing with each of the exponential number of possible cases separately would be very inefficient from the point of view of query processing.

Therefore, use Method 2 to generate the set of predicates to be checked for a partial match arriving at each server.

First, given a partial match at the head of the input queue, the server uses an index to quickly locate all matches at that server node that satisfy the relaxation of the predicate relating to the query root node of the partial match (which is guaranteed to be present) with the server node in the original XPath query. This predicate is obtained by composing the labels on the edges along the path from the server node to the root in the query.

Second, each element identified in the first step is compared with the input partial match by using a conditional predicate sequence. Such a sequence is created by examining the relationship between the server node and nodes that are either its ancestors or descendants in the original XPath query pattern. The predicates are obtained by composing the labels on the edges from the server node to the query tree node. For any node $n_i$ of the partial match that corresponds to a query node represented in the conditional predicate sequence, check for validation of the relaxation of the conditional predicate with the server node n (i.e., publisher in the example). If it is validated, check whether it is an exact predicate validation. This approach of using conditional predicate sequences at server nodes also enables incremental assignment of updated scores with extensions to the input partial match.

Method 2: Server Predicates Generation

```
Require: Query Q, Query Node n {n is current server node}
1:    Relaxation_with_rootNode = getComposition(n, rootNode(Q));
2:    structuralPredicate = Relaxation_with_rootNode;
3:    for each Node n' in Q do
4:      {isDescendant(a,b) evaluates to true if a descendant of b};
5:      if (isDescendant(n',n)) then
6:        Relaxation_with_serverNode = getComposition(n, n');
7:        conditionalPredicate+=Relaxation with serverNode;
8:      end if
9:      if (isDescendant(n, n') AND notRoot(n')) then
10:       Relaxation_with_serverNode = getComposition(n',n);
11:       conditionalPredicate+=Relaxation_with_serverNode;
12:     end if
13:   end for
```

5.2.2. Top-k Query Processing.

Two approaches are synthesized for top-k query evaluation, namely, lockstep and Method 1.

Lockstep.

This method is similar to the one proposed in {Ref 2}. S Different variations of the lockstep methods can be obtained by varying the components implementations (Section 6.1).

Method 1 (See "Method 1" Pseudocode Box):

Method 1 shows a top-k evaluation method instantiation. A few functions are highlighted in this method:

nextAnswer implements the router decision for picking the next answer according to some policy;

sendToNextServer implements a routing decision (see Section 6.1.4 for implementation alternatives);

nextAnswerAtS implements the priority queue strategy at each server (see Section 6.1.3 for implementation alternatives);

computeJoinAtS computes the join predicates at a server. This function can implement any join method; and checkTopK checks if a partial match needs to be discarded or kept using its current score and decides to update the top-k set accordingly.

6.1 mplementation Alternatives and Experimental Evaluation

The implementation of each component in the Method 1 architecture, along with experimental settings and experimental results, are next discussed.

6.1. Implementation Alternatives

This section discusses Method 1's choices for priority queues and routing decisions.

6.1.1. Scheduling Between Components.

There are two overall scheduling possibilities:

Single-Threaded:

The simplest alternative is to have a single-threaded implementation of all the components in the system. This would permit having complete control over which server processes next the partial match at the head of its input priority queue.

Multi-Threaded:

One can allocate a thread (or more) to each of the servers, as well as to the router, and let the system determine how to schedule threads. The use of priority queues (Section 6.1.3) and adaptive routing strategies (Section 6.1.4) allows to "control" query evaluation. In addition, by using different threads, Method 1 is able to take advantage of available parallelism.

6.1.2. Evaluation Methods.

Method 1M

"Method 1M" denotes a multi-threaded variation of Method 1. Each server is handled by an individual thread. In addition to server threads, a thread handles the router, and the main thread checks for termination of top-k query execution.

Method 1S.

"Method 1S" denotes a single-threaded scheduling variation of Method 1. Due to the sequential nature of Method 1S, Method 1's architecture (FIG. 4) is slightly modified: a partial match is processed by a server as soon as it is routed to it, therefore the servers' priority queues are not needed, and partial matches are only kept in the router's queue. Method 1S bears some similarities to both Upper {Ref 20} and MPro {Ref 7}. As in both techniques, partial matches are considered in the order of their maximum possible final score. In addition, as in Upper, partial matches are routed to the server using an adaptive technique. While Upper does not consider join evaluation, MPro use a join evaluation based on Cartesian product and individual evaluation of each join predicate score. In contrast, the invention's techniques use a different model for join evaluation where one single operation produces all valid join results at once.

LockStep.

LockStep considers one server at a time and processes all partial matches sequentially through a server before proceeding to the next server. A default implementation of LockStep keeps a top-k set based on the current scores of partial matches, and discards partial matches during execution. We also considered a variation of LockStep without pruning during query execution, LockStep-NoPrun, where all partial matches operations are performed, scores for all matches are computed, and matches are then sorted at the end so that the k best matches can be returned. Note that the LockStep method is very similar to the OptThres method presented in {Ref 2}. The relaxation adaptivity of Opt-Thres, which decides whether a partial match will be considered for relaxation depending on its score, is included in the default server implementation of Method 1.

6.1.3. Priority Queues.

Various strategies can be used for server prioritization, including the following.

FIFO.

The simplest alternative is to process partial matches in the queue in their arrival order. This scheme is sensitive to the actual order in which partial matches are processed, and performance may vary substantially.

Current Score.

Partial matches with higher current scores will be moved to the heads of their respective priority queues. This scheme is sensitive to the order in which partial matches are initially selected to be processed.

Maximum Possible Next Score.

The current score of a partial match is added to the maximum possible score it could receive from its current server, and partial matches with higher maximum possible next scores will be moved to the heads of their respective priority queues. This scheme adapts to the score that the current server could contribute to partial matches, making it less sensitive to the order in which partial matches are processed.

Maximum Possible Final Score.

The maximum possible final score determines which partial match to consider next. This scheme is less sensitive to the order in which partial matches are processed, and is the most adaptive queue prioritization alternative. Intuitively, this enables those partial matches that are highly likely to end up in the top-k set to be processed in a prioritized manner akin to join ordering. Although not reported due to space constraints, we verified this conjecture experimentally.

6.1.4. Routing Decisions.

Given a candidate answer at the head of the router queue, the router needs to make a decision on which server to choose next for the candidate answer. A candidate answer should not be sent to a server that it has already gone through. This routing choice may be made in various ways, including the following examples of server selection strategies:

Static.

The simplest alternative is to route each candidate answer through the same sequence of servers. For homogeneous data sets, this might actually be the strategy of choice, where the sequence can be determined a priori in a cost-based manner.

Score-Based (Maximum or Minimum).

The candidate answer is routed to the server that is likely to impact its score the most. Two variations of this routing technique can be considered: routing the candidate answer to the server that is likely to increase its score the most (max_score), or the least (min_score), based on some pre-computed or estimated information.

Size-Based.

The candidate answer is routed to the server that is likely to produce the fewest candidate answers, after pruning against the top-k set. Intuitively, the overall cost of the top-k query evaluation is a function of the number of candidate answers that are alive in the system. The size-based choice is a natural (simplified) analog of conventional cost-based query optimization for the top-k problem, and can be computed using estimates of the number of extensions computed by the server for a candidate answer (such estimates could be obtained by using work on selectivity estimation for XML), the range of possible scores of these extensions, and the likelihood of these extensions getting pruned when compared against the top-k set. Based on our experiments, size-based strategy provides the best response time.

Section 6.3.1 evaluated different partial match routing strategies for Method 1. In Method 1S, the method always chooses the partial match with the maximum possible final score as it is the one on top of the router queue. In addition, it is proven that this partial match will have to be processed before completing a top-k answer {Ref20}. We tried several queue strategies for both LockStep and Method 1M as described in Section 6.1.3. For all configurations tested, a queue based on the maximum possible final score performed better than the other queues. This result is in the same spirit as Upper {Ref 20} as it allows for partial matches that are likely to end up in the top-k set to be processed first. In the remainder of this disclosure, results that we report for LockStep and Method 1M techniques assume server queues on maximum possible final scores.

6.2. Experimental Setup

The three top-k query processing strategies were implemented in C++, using POSIX threads for Method 1M. We ran experiments on a Red Hat 7.1 Linux 1.4 GHz dual-processor machine with a 2 Gb RAM and a Sun F15K running Solaris 8 with 54 CPUs ranging from 900 MHz to 1.2 GHz, and 200 Gb of RAM.

6.2.1. Data and Queries.

Several documents were generated using the XMark document generating tool at monetdb(dot)cwi(dot)nl/xm/index(dot)html. Three queries were manually created by isolating XPath subsets of XMark queries that illustrate the different relaxations:

Q1: //item[./description/parlist]
Q2: //item[./description/parlist and ./mailbox/mail/text]
Q3: //item[./mailbox/mail/text[./bold and ./keyword] and ./name and ./incategory]

Edge generalization is enabled by recursive nodes in the DTD (e.g., parlist). Leaf node deletion is enabled by optional nodes in the DTD (e.g., incategory). Finally, subtree promotion is enabled by shared nodes (e.g., text).

When a query is executed on an XML document, the document is parsed and nodes involved in the query are stored in indexes along with "Dewey" encoding from www(dot)oclc(dot)org/dewey/about/about_the_ddc(dot)htm. Our server implementation of XPath joins at each server used a simple nested-loop method based on Dewey, since we are not comparing join method performance. The effect of server operation time and its tradeoff with adaptive scheduling time is discussed in Section 6.3.3. Scores for each match are computed using the scoring function presented in Section 4.

6.2.2. Evaluation Parameters (X-Axes).

Performance of the present disclosed techniques was measured for a variety of criteria summarized in Table 1:

TABLE 1

Evaluation Parameters

| Query Size | Doc Size | k | Parallelism | Scoring Function |
|---|---|---|---|---|
| 3 nodes (Q1) | 1 MB, | 3, | | |
| | *10 MB,* | *15,* | 1, 2, 4, ∞ | |
| 8 nodes (Q3) | 50 MB | 75 | | dense |

(defaults in bold italic)

Query Size:

We considered 3 query sizes: 3 nodes, 6 nodes, and 8 nodes (see Section 6.2.1). The number of servers is equal to the number of nodes involved in a query. The number of partial matches and thus the number of server operations for a top-k strategy is, in the worst case, exponential in the number of nodes involved in the query.

Document Size:

We considered XMark documents of sizes ranging from 1 Mb to 50 Mb.

Value of k:

We ran experiments for values of k ranging from 3 to 75. When the value of k increases, fewer partial matches can be pruned.

Parallelism:

The Method 1M approach takes advantage of multiple available processors. We experimented this strategy on different machines offering various levels of parallelism (from 1 to 48 processors).

Scoring Function:

We used the tf*idf scoring function described in Section 4. We observed that the tf*idf values generated for our XMark data set were skewed, with some predicates having much higher scores than others. Given this behavior, we decided to synthesize two types of scoring function based on the tf*idf scores, to simulate different types of datasets: sparse, where for each predicate, scores are normalized between 0 and 1 to simulate datasets where predicates scores are uniform, and dense, where score normalization is applied over all predicates to simulate datasets where predicate scores are skewed. (The terms sparse and dense refer to the effect of these functions on the distribution of final scores of partial matches.) We also experimented with randomly generated sparse and dense scoring functions. A sparse function allows for a few partial matches to have very high scores, resulting in high kth score values, which enables more pruning. With a dense scoring function, final scores of partial matches are close to each other, resulting in less pruning. Using different scoring functions permits study of the impact of score distribution on performance measures.

6.2.3. Evaluation Measures (Y-Axes).

To compare the performance of the different techniques, the following metrics were used:

Query Execution Time.

Overall time needed to return the top-k answers.

Number of Server Operations.

This measure allows us to evaluate the actual workload of the various techniques, regardless of parallelism.

Number of Partial Matches Created.

The fewer the created partial matches, the better the top-k query processing technique is at pruning during query execution.

6.3. Experimental Results.

We now present experimental results for the present disclosed top-k query evaluation methods. We first study various adaptive routing strategies (6.3.1), and settle on the most promising one. We then compare adaptive and static strategies (6.3.2), and show that adaptive routing outperforms static routing when server operation cost dominates in the query execution time (6.3.3), and that lockstep strategies always perform worse than strategies that let partial matches progress at different rates. We study the impact of parallelism (6.3.4) and of our evaluation parameters (6.3.5) on our adaptive techniques. Finally, in (6.3.6), we discuss scalability.

6.3.1. Comparison of Adaptive Routing Strategies.

We study the performance of adaptive routing strategies for our top-k techniques (Section 6.1.4). In particular, we considered the max score, min score and min alive partial—matches described in Section 6.1.4.

Figure 5:
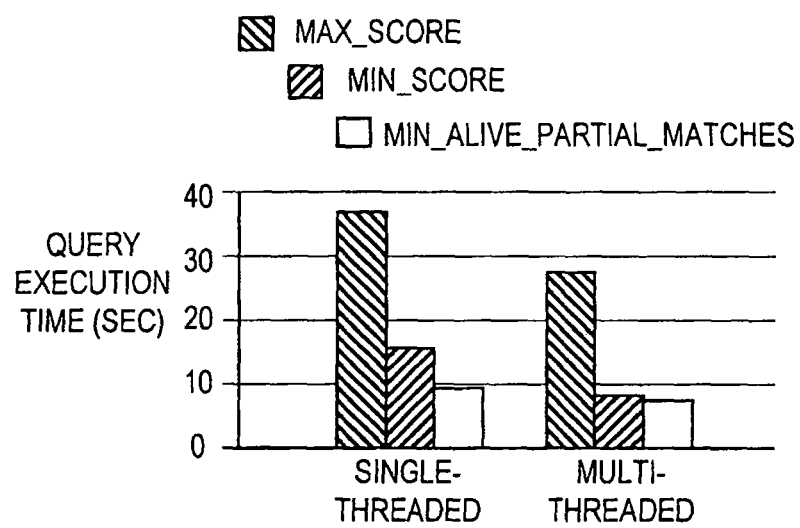
FIG. 5 shows query execution times for the single-threaded (S) and multithreaded (M) versions of a method for performing top-k queries of XML documents adaptively, for various adaptive routing strategies.

FIG. 5 shows the query execution time for Method 1S and Method 1M for the three routing strategies for the default setting of Table 1. Choosing servers that increase partial match scores the most (max score) does not result in fast executions as it reduces the pruning opportunities. In contrast, a score-based strategy that aims at decreasing partial matches scores (min score) performs reasonably well. By basing routing decisions on the number of alive partial matches after the server operation, the size-based strategy (min alive partial matches) is able to prune more partial matches, and therefore decrease its workload (number of server operations), resulting in lower query execution times. Because min alive partial—matches performs better than all other tested routing strategies over all configurations tested for our adaptive Method 1S and Method 1M techniques, we will use min alive partial—matches as Method 1's routing strategy in the rest of this disclosure.

6.3.2. Adaptive vs. Static Routing Strategies.

Figure 6:
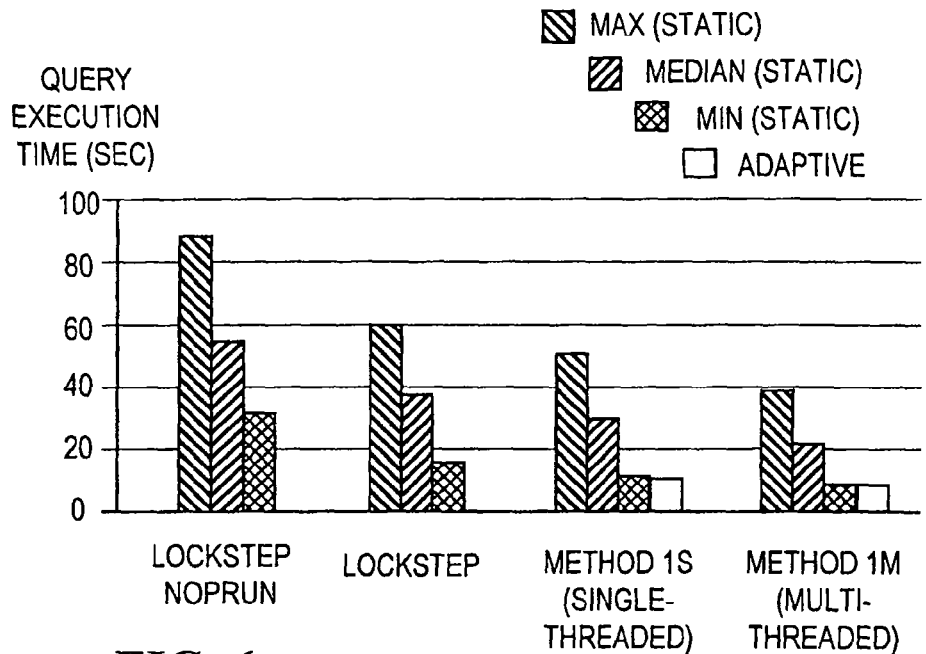
FIG. 6 shows query execution times for the Lockstep-NoPrun and Locksetp strategies, and single-threaded (S) and multi-threaded (M) versions of a method for performing top-k queries of XML documents adaptively.
Figure 7:
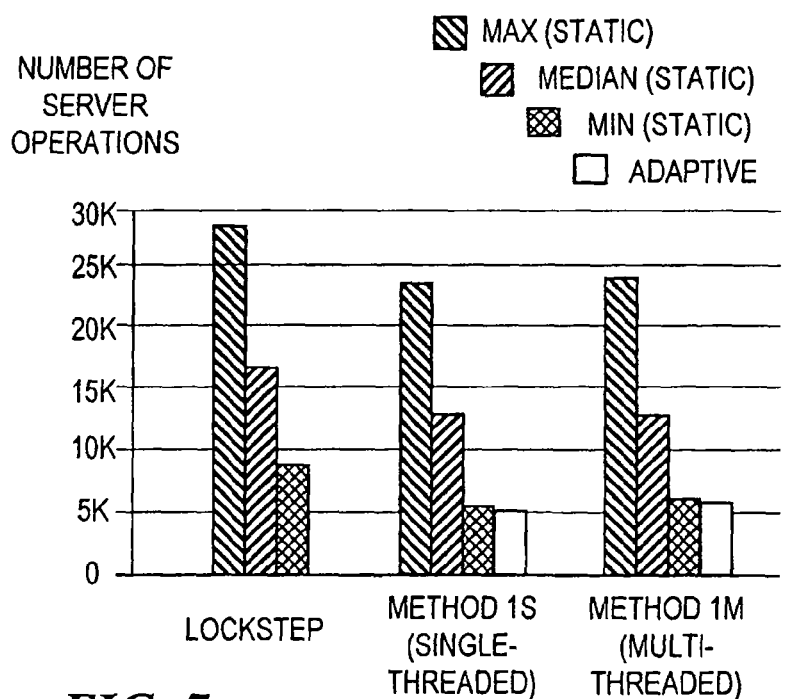
FIG. 7 graphs the number of server operations for the LockStep strategy and for the single-threaded (S) and multi-threaded (M) versions of a method for performing top-k queries of XML documents adaptively, for static and adaptive routing strategies.

We now compare adaptive routing strategies against static ones. FIGS. 6 and 7 show the query execution time and the number of server operations needed for Method 1S and Method 1M, as well as for both LockStep and LockStep-NoPrun using the default values in Table 1. For all techniques, we considered all (120) possible permutations of the static routing strategy, where all partial matches go through the servers in the same order. In addition, for Method 1S and Method 1M, we considered our adaptive strategy (see Section 6.3.1). For both LockStep strategies, all partial matches have to go through one server before the next server is considered, LockStep is thus static by nature. This implementation of LockStep is similar to the OptThres method presented in {Ref 2}.

For all techniques, we report the min, max and median values for the static routing strategy. A perfect query optimizer would choose the query plan that results in the min value of the static routing strategy. A first observation from FIGS. 6 and 7 is that for a given static routing strategy, Method 1M is faster than Method 1 S, which in turn is faster than LockStep. Thus, allowing some partial matches to progress faster than others, by letting them being processed earlier by more servers, results in savings in query execution time and total number of server operations. The no-pruning version of LockStep is obviously worse than all other techniques, proving the benefits of pruning when processing top-k queries. In addition, for both Method 1S and Method 1M, we see that our adaptive routing strategy results in query execution times at least as efficient as the best of the static strategies. (For dense scoring functions, adaptive routing strategies resulted in much better performance than the best static strategy.) Interestingly, for this default setting, Method 1M performs slightly more server operations than Method 1S. The better performance of Method 1M is due to its use of parallelism (2 processors are available on our default machine) to speed up query processing time.

Since Method 1 always outperforms LockStep, and Method 1's adaptive routing strategy performs as well as or better than its static one, we will only consider the adaptive routing versions of Method 1S and Method 1M in the rest of this disclosure. The terms Method 1S and Method 1M refer to their adaptive versions.

6.3.3. Cost of Adaptivity.

Figure 8:
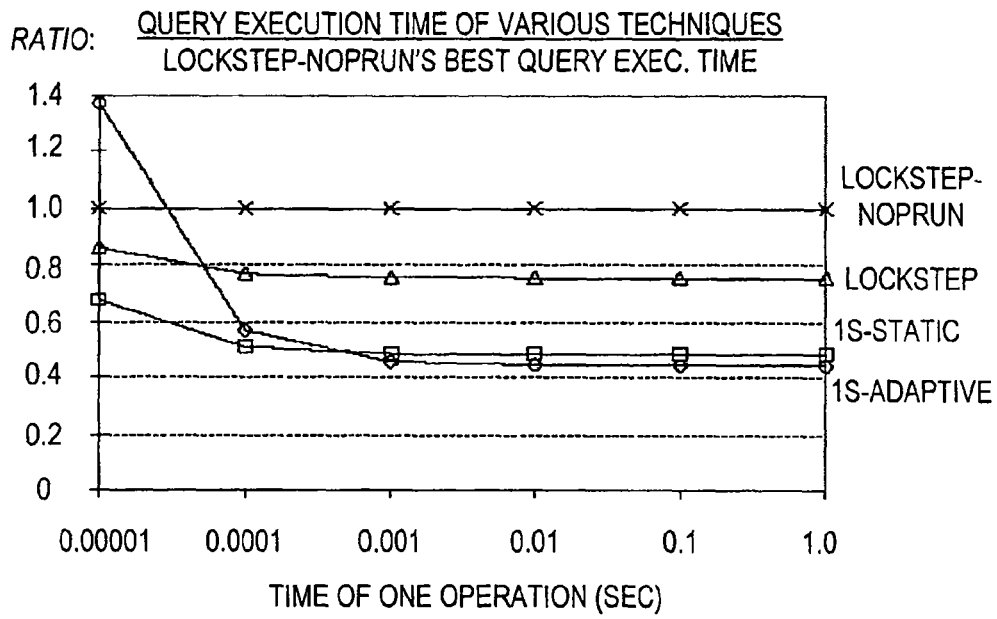
FIG. 8 graphs the ratio of query execution time of different techniques over LockStep-NoPrun's best query execution time, for different join operation cost values.

While adaptivity allows to reduce the number of server operations, and therefore leads to reduction in query processing time, it also has some overhead cost. In FIG. 8, we compare the total query execution time of Method 1S with both static and adaptive routing strategies to that of the best Lock-Step execution (both with and without pruning) Results are presented relative to the best LockStep-NoPrun query execution time. (We do not present results for Method 1M in this section as it is difficult to isolate the threading overhead from the adaptivity overhead). While for static routing strategies, an adaptive per-tuple strategy (Method 1 S-STATIC) always outperforms the LockStep techniques by about 50%, the adaptive version of Method 1S performs worse than the other techniques if server operations are very fast (less than 0.5 msecs). For query executions where server operations take more than 0.5 msecs each, Method 1S-ADAPTIVE is 10% faster than its static counterpart. (For larger queries or documents, the tipping point is lower than 0.5 msecs, as the percentage of tuples pruned as a result of adaptivity increases.) Adaptivity is then useful when server operation time dominates in the query execution time. However, when server operations are extremely fast, the overhead of adaptivity is too expensive. These results are similar to what was observed in {Ref 12} and {Ref 20}. As a final observation, in scenarios where data is stored on disk, server operation costs are likely to rise; in such scenarios, adaptivity is likely to provide important savings in query execution times. In the future, we plan on performing adaptivity operations "in bulk", by grouping tuples based on similarity of scores or nodes, in order to decrease adaptivity overhead.

We present results for the case where join operations cost around 1.8 msecs each.

6.3.4. Effect of Parallelism.

We now study the effect of parallelism on the query execution time of Method 1M. Note that in Method 1M, the number of threads is equal to the number of servers in the query+2 (router thread and main thread), thus Method 1M is limited in its parallelism. To show the maximum speedup due to parallelism of Method 1M we performed experiments over an infinite number of processors. (The actual number of processors used in the experiment is 54, which is much higher than the 10 processors that Method 1M would use for Q3.)

Figure 9:
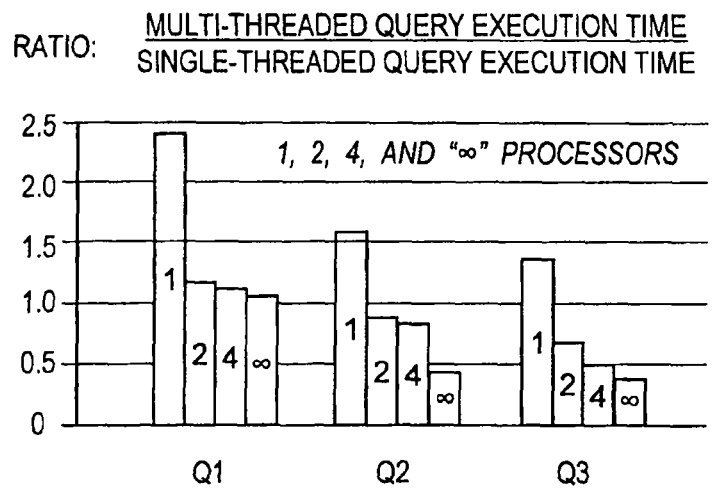
FIG. 9 shows the ratio of the multi-threaded (M) to the single-threaded (S) versions' query execution time.

Unlike Method 1M, Method 1S is a sequential strategy, thus its execution time is not affected by the available parallelism. To evaluate the impact of parallelism on Method 1M execution time, we ran experiments on a 10 Mb document for all three queries, using 15 as the value for k, on four different machines with 1, 2, 4 and ∞ processors respectively. (Our four-processor machine was actually a dual Xeon machine with four "logical" processor.) We then computed the speedup of Method 1M over the execution time of Method 1S, and report our results in FIG. 9. When there is no parallelism, i.e., when the number of available processors is equal to one, the performance of Method 1M compared to that of Method 1S depends on the query size: Method 1M can take more than twice the time of Method 1S for small queries but becomes faster, when parallelism is available, for large queries. When multiple processors are available, Method 1M becomes faster than Method 1S, up to 1.5 times faster with two processors, up to 1.95 times faster with four processors, and up to a maximum of almost 3.5 times faster when the number of available processors is unlimited. For Q1, Method 1M is not faster than Method 1S, even when parallelism is available, as Q1 only has three servers and does not take as much advantage of parallelism as Q2 and Q3, making the threading overhead expensive in comparison to the gains of parallelism. In addition, Q1 is evaluated faster than Q2 and Q3, and is thus more penalized by the threading overhead. For Q2 and Q3, Method 1M takes advantage of parallelism, with better results for Q3 than Q2, as it is a larger query.

The speedup stops increasing when the number of processors exceeds the number of threads needed to evaluate the query. Our example queries do not take advantage of parallelism greater than the number of servers involved in the query+2 (router and main threads). Thus Q1 does not benefit from more than 5 processors, Q2 from more than 8 processors, and Q3 from more than 10 processors. If more parallelism is available, we could create several threads for the same server, thus increasing parallelism even more.

Thus, studying the effect of parallelism on Method 1 approaches 2S (single-thread) and 2M (multi-thread), it is observed that although Method 1M is better for most cases in which parallelism is not available or if query size or document size is small; of course, Method 1M has more threading overhead. In contrast, for large queries and large documents, Method 1M exploits available parallelism and results in significant savings in query execution time over Method 1S.

6.3.5. Varying Evaluation Parameters.

We now study the effect of our parameters from Section 6.2.2.

Varying Query size.

Figure 10:
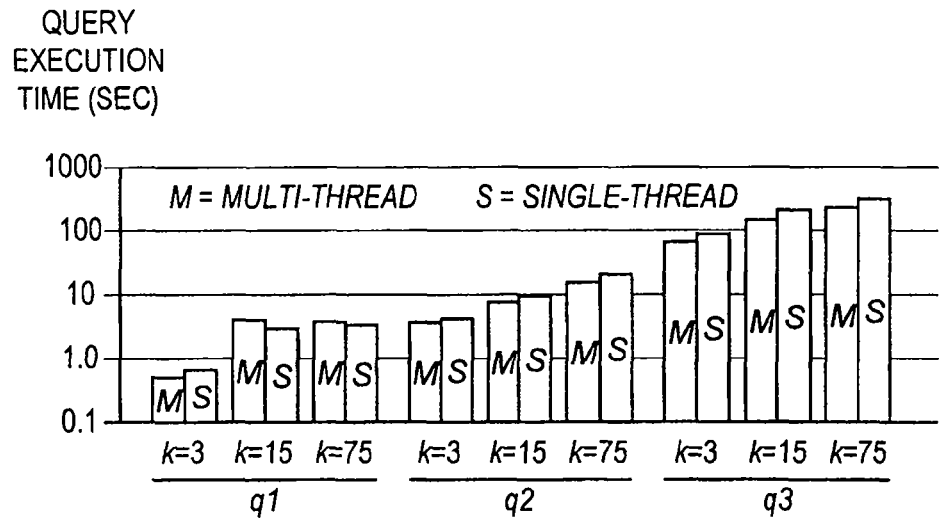
FIG. 10 shows query execution time for the multi-threaded (M) to the single-threaded (S) versions, as a function of k and the query size (logarithmic scale)

FIG. 10 shows the query execution time for both Method 1S and Method 1M for our three sample queries (Table 1), on a logarithmic scale. The query execution time grows exponentially with the query size. Because of the logarithmic scale, the differences between Method 1S and Method 1M are larger than they appear on the plot. The difference between Method 1M and Method 1S query execution time increases with the size of the query, with Method 1S 20% faster for Q1 and Method 1M 48% faster for Q3 (k=15), since the threading overhead has less impact on larger queries.

Varying k.

FIG. 10 also reports the effect of varying the number of matches returned in the top-k answer. The query execution time is linear with respect to k. Interestingly, the difference in query execution time between Method 1S and Method 1M increases with k. This increase is more significant for larger query sizes, and Method 1 M is up to 60% faster than Method 1S for Q3, k=75. The number of server operations exhibits a similar behavior (although at a smaller scale), with 8% less server operation for Method 1M for the Q3, k=75 setting. This is rather counter-intuitive: {Ref 7} proved that sequential top-k methods based on probing the partial match with the highest possible final score, as does Method 1S, minimizes the total number of operations with respect to a given routing strategy. Since our implementations of Method 1S and Method 1M use the same routing strategy, Method 1S should always perform less server operations. The explanation lies in our adaptive routing strategy: min alive partial matches relies on score estimates, server selectivity and current top-k values to make its choice. This last parameter, current top-k values, changes during query execution. Monitoring the executions of Method 1S and Method 1M show that top-k values grow faster in Method 1M than in Method 1S, which may lead to different routing choices for the same partial match, making the methods follow, in effect, different schedules for the same partial match. By making better routing choices, Method 1M results in fewer partial matches being created than Method 1S.

Varying Document Size.

Figure 11:
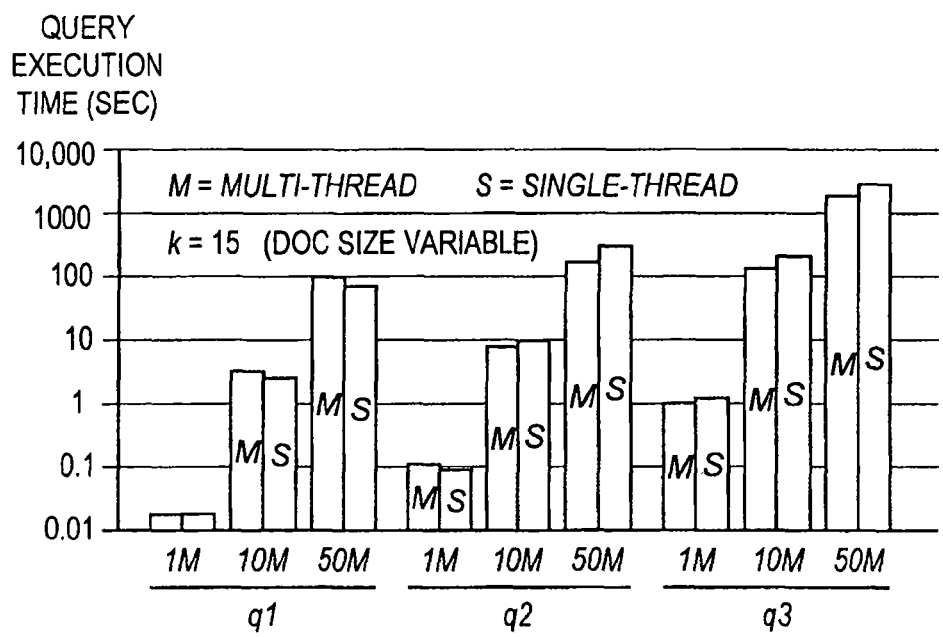
FIG. 11 shows query execution time for the multi-threaded (M) to the single-threaded (S) versions, as a function of document and query sizes (logarithmic scale, k=15)

FIG. 11 reports on the effect of the XML document size on the query execution time. The execution time grows exponentially with the document size; the larger the document, the more partial matches will have to be evaluated resulting in more server operations and thus longer query execution times. For a small document, the result is quite fast (less than 1.2 sec for all queries tested), making the threads overhead in Method 1M expensive compared to Method 1S execution time. However, for medium and large documents, Method 1M becomes up to 92% faster than Method 1S (Q2, 50M document, k=15).

Varying Scoring Function.

We experimented with different scoring functions: both sparse and dense variations of the tf*idf scoring function, as well as randomly generated scoring functions that were designed to have either dense or sparse properties. We observed that sparse scoring functions lead to faster query execution times (due to faster pruning). In contrast, with dense scoring functions, the relative differences between Method 1M and Method 1S is greater with Method 1M resulting in greater savings in terms of query processing time, number of server operations and partial matches created over Method 1S.

6.3.6. Scalability.

A top-k processing technique over XML documents has to deal with the explosion of partial matches that occurs when query and document sizes increase. To measure the scalability of Method 1, we considered the number of partial matches created during query execution, as a ratio of the maximum possible number of such partial matches. The total number of partial matches is obtained by running an method with no pruning (LockStep-NoPrun). Table 2 shows that the percentage of total possible partial matches created by Method 1M as a function of maximum possible number of partial matches, for different query and document sizes.

The percentage of total possible partial matches significantly decreases with the document and query sizes.

TABLE 2

Percentage of partial matches created by Multi-thread version

| Document Size: | 1 MB | 10 MB | 50 MB |
|---|---|---|---|
| Q1 | 100% | 93.12% | 85.66% |
| Q2 | 100% | 49.56% | 57.66% |
| Q3 | 100% | 39.59% | 31.20% |

The benefits of pruning are modest for small queries. While all partial matches are created for Q1, for which tuples generated by the root server do not create "spawned" tuples in the join servers, pruning allows to reduce the number of operations of these partial tuples. For large queries (Q3), Method 1M evaluates less than 86% of the partial matches on the 1M document, and less than 32% on the 50M document. By pruning partial matches based on score information, Method 1M (and Method 1S) exhibits good scalability in both query and document size.

Flowchart Descriptions.

Figure 12:
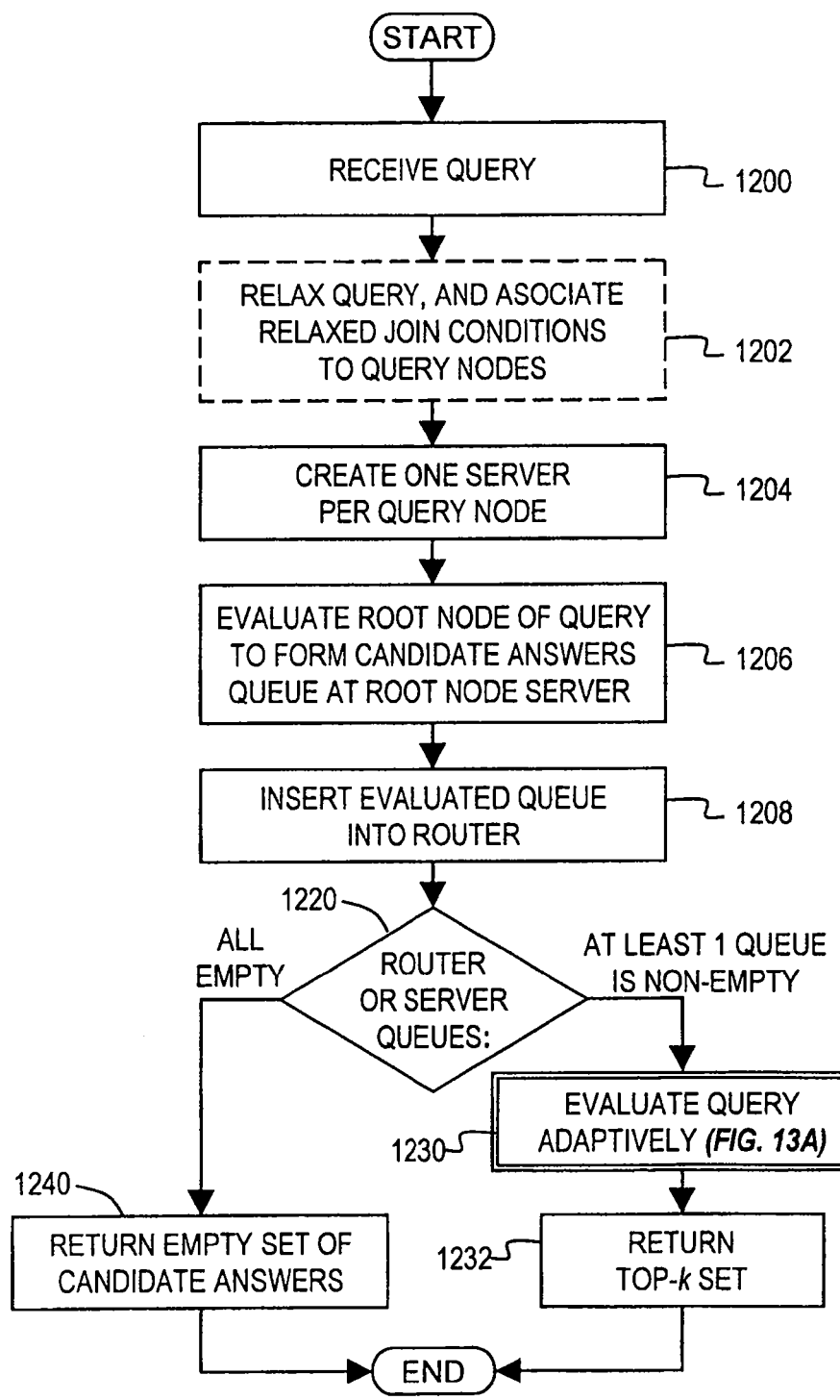
FIG. 12 is a high-level flowchart of one embodiment of "Method 1" (see box in Detailed Description)

To supplement the foregoing description of Methods 1 and 2 (presented in pseudocode boxes above), a description of the flowcharts in FIG. 12 and FIGS. 13-14 is now presented.

FIG. 12 is a high-level flowchart of one embodiment of "Method 1" discussed above.

In FIG. 12, block 1200 indicates input of an original query Q.

Block 1202, drawn in dashed lines to emphasize its optional nature, indicates the relaxing of the query, Q, to form a relaxed query. This relaxation corresponds to rewriting the query using "Method 2". The relaxation step is optional, being used if approximate query answers are desired in addition to exact answers. Henceforth, when context permits, the original query and the relaxed query may simply be referred to as the query.

Preferably, the relaxing step involves forming a relaxed query tree that has less than or equal to the number of nodes in the original query. This property supports the monotonicity property that in turn helps to guarantee the scoring method (described below) provides efficient evaluation of top-k queries.

Block 1204 indicates the creation of one server per query node. A query may be expressed as a rooted tree (see FIGS. 1, 2). A server is created for each node in the query tree, including the root node.

Block 1206 indicates the evaluation of the root node of the query tree, to allow the candidate answers (see FIG. 4) at the root server to be generated and inserted into the root server's priority queue.

Block 1208 indicates the insertion of the root server's priority queue into the router queue in order to start query evaluation. The router queue is responsible for routing candidate answers to the next servers.

Block 1220 indicates a test as to whether or not the router queue or all server priority queues are empty. If the router queue and all server priority queues are empty, then control passes to block 1240 which indicates the returning of the "empty set" of candidate answers. However, if the router queue or any server priority queue is not empty, then control passes to block 1230 in which the query is evaluated adaptively to arrive at a top-k set that is returned in block 1232.

FIG. 13 is a high-level flowchart of one embodiment of a "Method 1" for performing top-k queries of XML documents adaptively (see box in Detailed Description), "Method 1" constituting a detail of the "Evaluate Query Adaptively" box 1230 in FIG. 12.

Figure 13A:
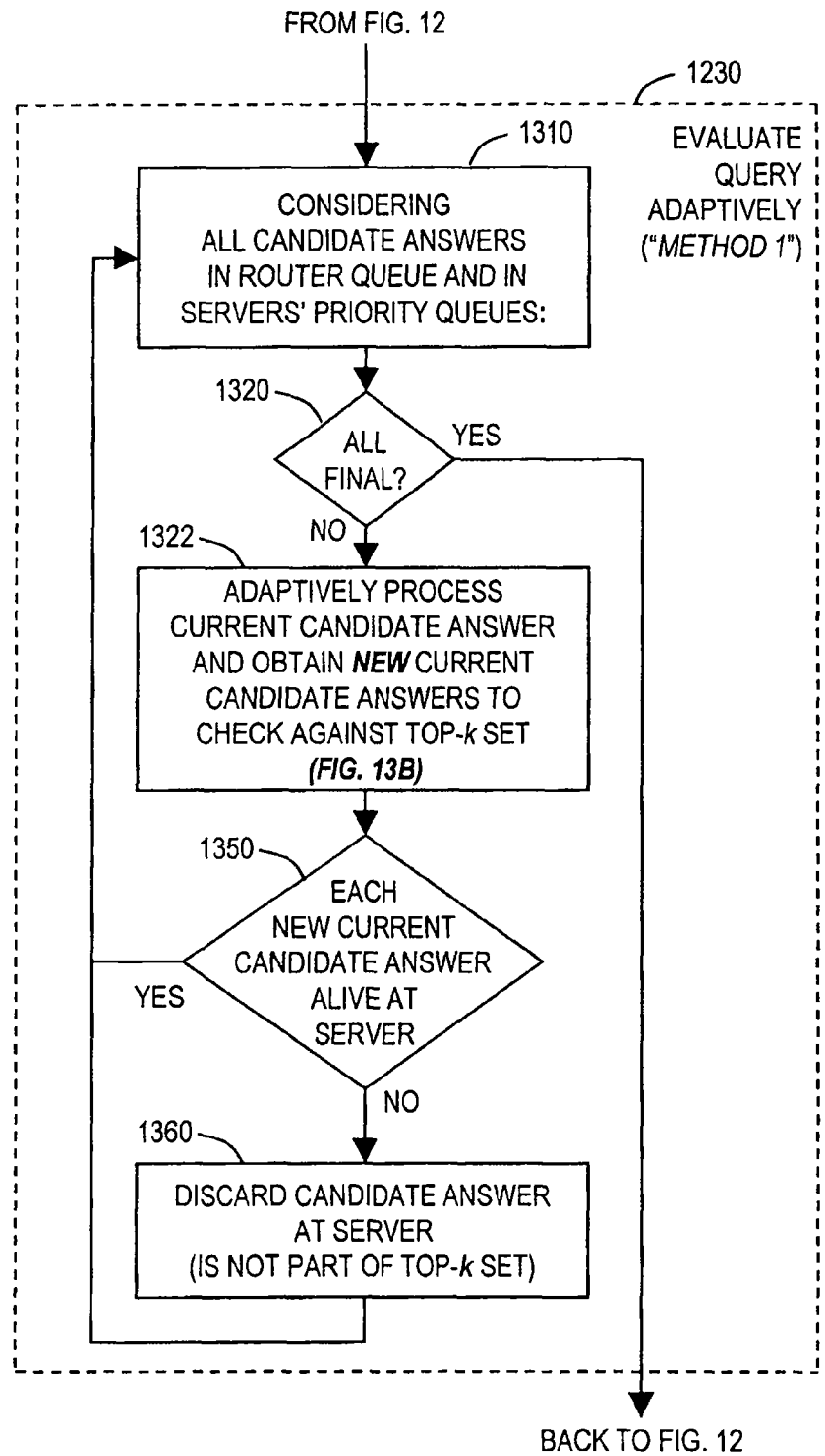
FIGS. 13A, 13B (collectively, "FIG. 13") depict a high-level flowchart of one embodiment of a method for performing top-k queries of XML documents adaptively (see "Method 1" box in Detailed Description), "Method 1" constituting a detail of the "Evaluate Query Adaptively" block 1230 in FIG. 12.

In FIG. 13A, block 1310 indicates the examination of all candidate answers in the router queue and in the servers' respective priority queues to determine if all the answers are complete (final). Block 1320 depicts a decision block that branches based on block 1330's examination of whether or not all candidate answers are complete (final). If all candidate answers have been completed, then control passes directly out of FIG. 13A to return to FIG. 12 block 1232. However, if all candidate answers have not been completed, this means that some of the candidate answers are still partial answers and control passes to block 1330 in FIG. 13B, so that the operations in blocks 1330-1338 in FIG. 138 may be performed.

Figure 13B:
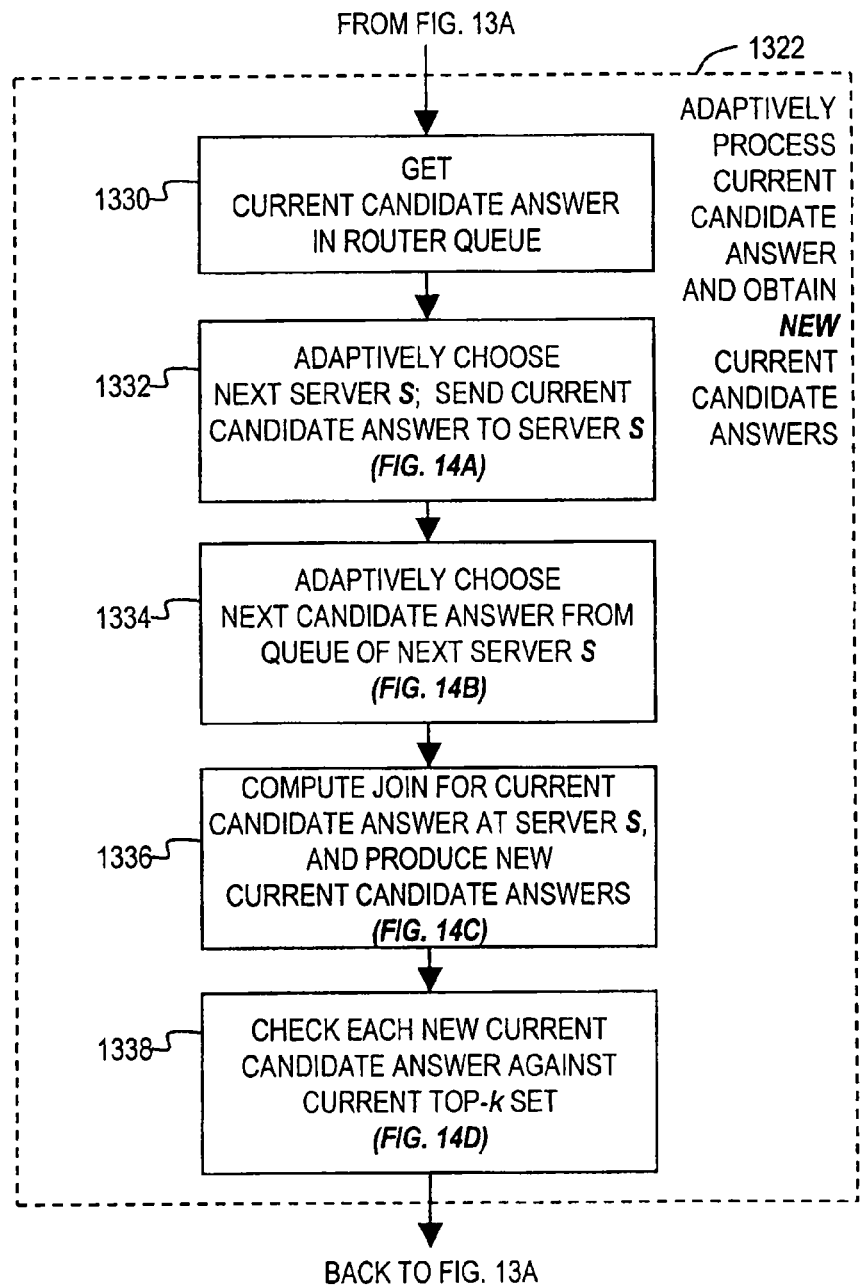

In FIG. 13B, block 1330 indicates the reading of the current candidate answer from the router queue.

Figure 14A:
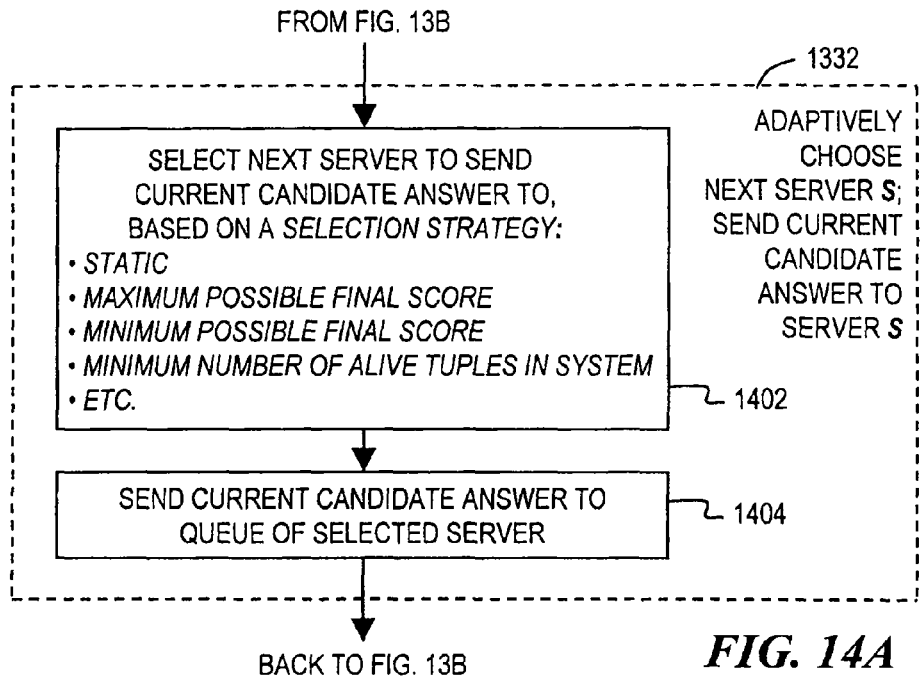
FIGS. 14A, 14B, 14C, 14D (collectively, "FIG. 14") are flowcharts showing possible implementations of respective blocks 1332, 1334, 1336, 1338 in FIG. 13.

Block 1332 indicates the sending of the current candidate answer to a next server S. One implementation of step 1332 is shown in FIG. 14A. Once the candidate answer is sent to a server S, it is inserted into the server's priority queue.

Figure 14B:
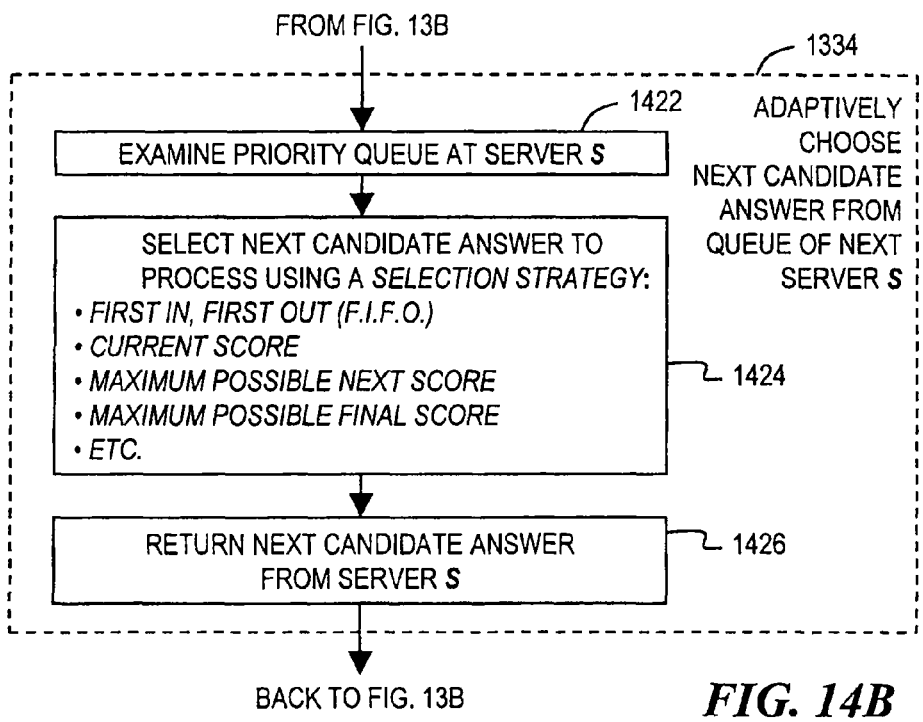

Block 1334 indicates that after updating the priority queue at server S, the newly updated priority queue is examined to choose the next candidate answer from that queue. One implementation of step 1334 is shown in FIG. 14B.

Figure 14C:
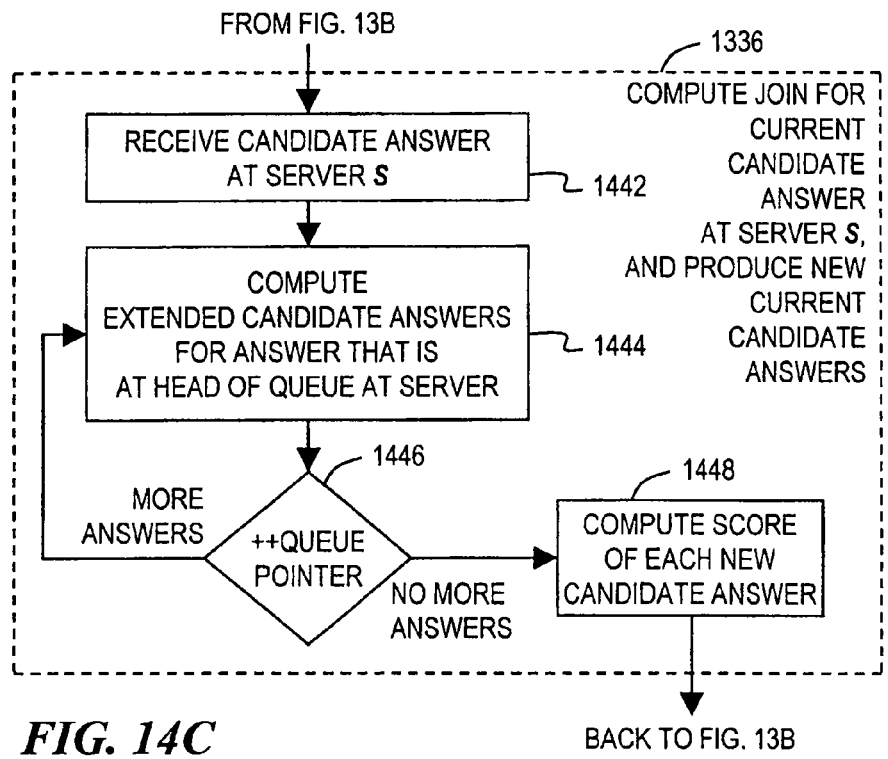

Block 1336 indicates that, once the next candidate answer is chosen at server S, a join is computed for that candidate answer, and new current candidate answers are produced as a result of that join. One implementation of step 1336 is shown in FIG. 14C.

Figure 14D:
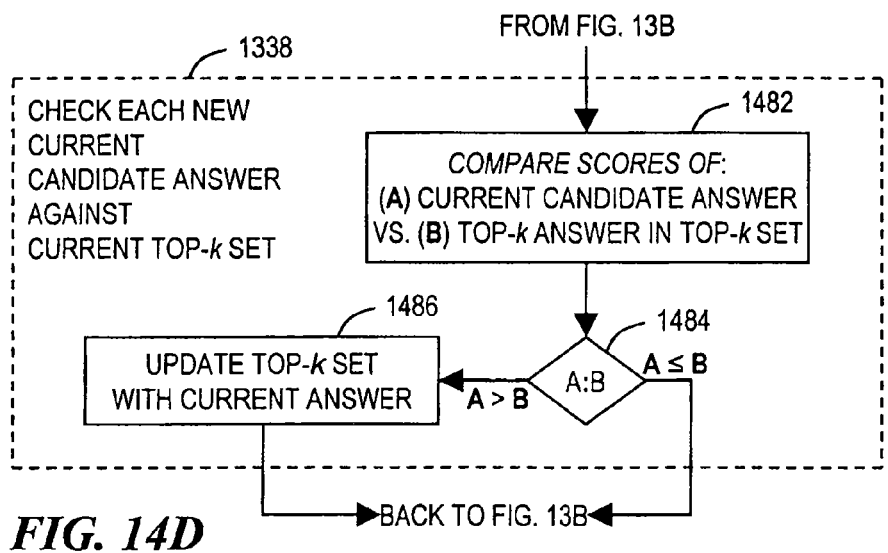

Block 1338 indicates the checking of each newly generated candidate answer against the current top-k set of candidate answers in order to determine whether it is kept alive in the system or discarded. One implementation of step 1338 is shown in FIG. 14D. Block 1338 then passes control back to block 1350 in FIG. 13A.

Referring again to FIG. 13A, block 1350 indicates a determination of whether the current answer is alive at the server after that answer has been checked against the current top-k set of candidate answers. Briefly, the term "alive" means that the answer's score permits it to remain in the system and be router to the next server. If the current candidate answer is still alive, then control passes back to block 1310 for an examination of whether all answers in the router queue and in the servers' priority queues have been completed. However, if the current answer is not alive at the server, then control passes to block 1360.

Block 1360 indicates the discarding of the current candidate answer at the server, as the current answer does not remain in the process and is not to become part of the top-k set. Control then passes back to FIG. 12 block 1232.

FIGS. 14A, 14B, 14C, 14D (collectively, "FIG. 14") are flowcharts showing possible implementations of respective blocks 1332, 1334, 1336, 1338 (FIG. 13B).

Referring to FIG. 14A, block 1332 indicates the adaptively choosing of a next server S to which a current candidate answer is sent. Within block 1332, block 1402 indicates various strategies of determining the next server to which the current candidate answer is sent. See section 6.1.4, above:

A first strategy, a "static" strategy, involves routing each candidate answer through the same sequence of servers.

The second strategy is based in determining the server that provides the maximum possible final score for that candidate answer.

The third strategy is based on choosing the server that provides the minimum possible final score for the candidate answer.

The fourth strategy is based on choosing the server that minimizes the number of alive candidate answers (referred to as tuples in block 1402). The inventors' experimental evaluation shows that this strategy provides the best performance results, and thus may be a strategy of choice for determining the server to which to send the current candidate answer for further join processing.

This list is non-exhaustive, as other strategies for selecting a next server may be used.

Block 1404 indicates the sending of the candidate answer to the priority queue of the server was selected in block 1402. Thereafter, control returns to FIG. 13B block 1334.

Referring to FIG. 14B, block 1334 indicates the choosing of a next candidate answer to be read from the priority queue of "next" server S. Within block 1334, block 1422 indicates the examination of the priority queue at server S. Block 1424 indicates the selection of the next answer to be processed. This selection may be by one of a number of selection methods that are outlined in §6.1.3 of this disclosure. Examples of selection methods include the first-in-first-out (FIFO) method, the "current score" method, the maximum possible next score, the maximum possible final score, and so forth. Block 1426 indicates that a candidate answer at server S has been chosen based on one of the above selection methods, before control returns to FIG. 13B block 1336.

Referring to FIG. 14C, block 1336 indicates the computing of a join for the current candidate answer at server 5, and the production of new current candidate answers. Within block 1336, block 1442 indicates the receiving of the candidate answer at server S. Block 1444 indicates the computation of extended answers for the answer that is at the head of the priority queue at the server. Thereafter, at block 1446, the queue pointer is incremented and it is determined whether, based on the incremented value of the queue pointer, there are more candidate answers. If there are more answers to process, control returns to block 1444 for computation of more extended answers. However, if there are no more answers to process, then control passes to block 1448 in which the score of each new answer is computed before control returns to FIG. 13B block 1338.

The calculating step has the property that calculating scores of progressively smaller fragments of the query that are matched by a candidate answer, to be correspondingly smaller scores. This monotonicity property helps to guarantee the scoring method provides efficient evaluation of top-k queries.

Referring to FIG. 14D, block 1338 indicates the checking of the current candidate answer against the current top-k set of candidate answers. Within block 1338, block 1482 indicates the comparison of (A) the score of the current answer to (B) the score of the kth answer in the top-k set, the result of the comparison being used in decision block 1484. If the score of the current answer is larger, then control passes to block 1486 in which the top-k set is updated with the current answer before control returns to FIG. 13B block 1350. However, if the score of the current candidate answer is smaller, then control passes back to FIG. 13B block 1350 without updating the top-k set.

The present disclosure has described an adaptive evaluation strategy for computing exact and approximate top-k answers of XPath queries. Experimental results show that adaptivity is very appropriate for top-k queries in XML. The best adaptive strategy focuses on minimizing the intermediate number of alive partial answers in a manner analogous to traditional query optimization in RDBMS where the focus is on minimizing intermediate table sizes. By letting partial matches progress at different rates, Method 1 results in faster query execution times than conventional methods. In addition, Method 1 scales well when query and document size increase.

The disclosed methods may be executed by any appropriate general purpose computer systems employing technology known by those skilled in the art to be appropriate to the functions performed. Appropriate software can readily be prepared by programmers based on the present teachings, using suitable programming languages operating with appropriate operating systems. Generally, such computers include at least one bus (including address, data, control) that connects various elements, including a processor for executing program instructions, memory for holding the program instructions and other data, disks and other storage devices for storing the program instructions and other information, computer readable media storing the program instructions, input and output devices, as well as various other elements such as ASICs, GALs, FPGAs, drivers, accelerators, DMA controllers, and the like. Such computer readable media constitute a computer program product including computer executable code or computer executable instructions that, when executed, causes the computer to perform the methods disclosed herein. Examples of computer readable media include hard disks, floppy disks, compact discs, DVDs, tape, magneto optical disks, PROMs (for example, EPROM, EEPROM, Flash EPROM), DRAM, SRAM, SDRAM, RDRAM, and the like.

From the foregoing, it will be apparent to those skilled in the art that a variety of methods, systems, computer programs on recording media, and the like, are provided.

The foregoing description supports a method of adaptively evaluating a top-k query with respect to at least one document. The method may involve, based on the query, forming (1204) a plurality of servers having respective server queues configured to store candidate answers that may constitute partial answers and final answers; processing (1322) the candidate answers in the server queues; and providing (1232) the top-k set as an evaluation of the top-k query. The processing step may include adaptively choosing (1402) a winning server to whose queue a current candidate answer should be sent; sending (1404) the current candidate answer to the winning server's queue; b3) adaptively choosing (1334) a next candidate answer to process from among candidate answers in the winning server's queue; computing (1336) a join between the current candidate answer and next candidate answers at the winning server, so as to produce a new current candidate answer; and updating (1338) a top-k set with the new current candidate answer only if a score of the new current candidate answer exceeds a score of a top-k answer in a top-k set.

The step of adaptively choosing (1402) a winning server may be carried out by a selection strategy that is chosen from a group of selection strategies consisting essentially of: (i) choosing, as the winning server from among candidate servers, a candidate server that is determined statically, before the query is executed, so that all candidate answers are routed through a predetermined sequence of servers; (ii) choosing, as the winning server from among the candidate servers, a candidate server that allows the current candidate answer to achieve a maximum possible final score; (iii) choosing, as the winning server from among the candidate servers, a candidate server that allows the current candidate answer to achieve the minimum possible final score; and (iv) choosing, as the winning server from among the candidate servers, a candidate server that is likely to produce fewest candidate answers after pruning against the top-k set.

The step of adaptively choosing (1334) a next candidate answer, may involve selecting (1424) the next candidate answer from among candidate answers in the winning server's priority queue according to a selection strategy.

The selection strategy may be chosen from a group of strategies (1424) consisting essentially of: a first-in-first-out (FIFO) selection strategy; selecting an answer with a maximum current score; selecting an answer with a maximum possible next score; and selecting an answer with a maximum possible final score.

The document may be expressed in a nested-structure, document-specific markup language; and the query may be expressed as a tree including (A) query nodes that are associated with respective servers; (B) links that are associated with join conditions that define relationships among the query nodes as being children, parents, ancestors or descendants of each other; and (C) a query root node that represents answers to be returned.

The nested-structure, document-specific markup language may be extensible markup language (XML).

The answers may include a complete answer to an original, non-relaxed query, satisfying all requirements of the original query.

The method may further comprise relaxing (1202) an original query to form at least one relaxed query; and the answers may include a complete answer to a relaxed query, satisfying all requirements of the relaxed query but satisfying less than all requirements of the original query.

The original query may be expressed as an original query tree; the relaxed query may be expressed as a relaxed query tree; the relaxing step (1202) may involve removing from the original query, a requirement that a leaf node must be found in the input document; and the relaxing step (1202) may include preserving a shape of the original query tree while forming the relaxed query tree to have no more nodes than the original query tree.

The original query may be expressed as an original query tree; the relaxed query may be expressed as a relaxed query tree; the relaxing step (1202) may involve removing from the original query, a requirement, in a relationship between an ancestor node and a descendant node, that an intermediate node between the ancestor node and the descendant node be included in the relationship; and the relaxing step (1202) may include preserving a shape of the original query tree while forming the relaxed query tree to have no more nodes than the original query tree.

The original query may be expressed as an original query tree; the relaxed query may be expressed as a relaxed query tree; the relaxing step (1202) may involve replacing in the original query, a child relationship between an ancestor node and a descendant node by a descendant relationship between the two nodes; and the relaxing step (1202) may include preserving a shape of the original query tree while forming the relaxed query tree to have no more nodes than the original query tree.

The present disclosure further supports a method of adaptively evaluating a query with respect to at least one document that is expressed in a nested-structure, document specific markup language. The method may involve (a) receiving (1201) a query that is expressed as a tree of a degree d≥3, the tree including (A) query nodes and (B) links that define relationships among the query nodes as being parents, children, ancestors or descendants of each other; (b) calculating (1448) scores for respective candidate answers that may include partial or final answers, at least one score including (~tf) (b1) a first portion determined by how many children or descendants a first node has, that are at a given level beneath the first node and that satisfy a first query requirement for that given level; and (~idf) (b2) a second portion determined by what fraction of all a second node's children or descendants at a predetermined level, satisfy a second query requirement for that second node; and (c) applying (1338) the scores to govern a processing order of the candidate answers to arrive at an evaluation of the query.

The (~tf*idf) score may be directly proportional to a mathematical product of the first portion (b1) and the second portion (b2).

The candidate answers may include fragments of the at least one document that are less than the entire one document.

The calculating step may constitute calculating scores of progressively smaller fragments of the query that are matched by a candidate answer, to be correspondingly smaller scores (monotonicity).

The present disclosure further supports computer program products including computer executable code or computer executable instructions that, when executed, causes a computer to perform the methods described herein.

The present disclosure also supports systems configured to perform the methods described herein.

The foregoing description further supports a computer program product including computer executable code or computer executable instructions that, when executed, causes a computer to perform foregoing methods.

The foregoing description further supports a system configured to perform the methods described above.

Many alternatives, modifications, and variations will be apparent to those skilled in the art in light of the above teachings. For example, the choice of hardware or software on which the inventive methods are implemented, and the distribution of where in hardware or software steps of those methods are executed, may be varied while remaining within the scope of the invention. It is therefore to be understood that within the scope of the appended claims and their equivalents, the invention may be practiced otherwise than as specifically described herein.

What is claimed is:

1. An apparatus for adaptively evaluating a top-k query with respect to a document, the apparatus comprising:
   a processor;
   a memory to store computer program instructions, the computer program instructions when executed on the processor cause the processor to perform operations comprising:
   relaxing an original query to form a relaxed query, the original query comprising a tree structure having a plurality of query nodes;
   based on the relaxed query, forming a plurality of servers, each server corresponding to a respective query node in the tree structure and having a respective server queue configured to store candidate answers that constitute one of partial answers and final answers;
   processing the candidate answers in the server queues by operations including:
   adaptively choosing a winning server, from the plurality of servers, that is likely to produce fewest candidate answers after pruning against a top-k set and to whose queue a current candidate answer should be sent;
   sending the current candidate answer to the winning server's queue;
   adaptively choosing a next candidate answer to process from among candidate answers in the winning server's queue by selecting an answer with a maximum possible next score, the maximum possible next score determined by adding a current score of the answer to a maximum possible score the answer could receive from its current server;
   computing a join between the current candidate answer and next candidate answers at the winning server, so as to produce a new current candidate answer; and
   updating the top-k set with the new current candidate answer only if a score of the new current candidate answer exceeds a score of a top-k answer in a top-k set; and
   providing the top-k set as an evaluation of the top-k query;
   wherein the candidate answers include fragments of the document that are less than the entire document and the score of each candidate answer is calculated by calculating scores of progressively smaller fragments of the query that are matched by each candidate answer to be correspondingly smaller scores, the candidate answers including a complete answer to the relaxed query and satisfying all requirements of the relaxed query but satisfying less than all requirements of the original query.

2. The apparatus of claim 1, wherein, the document is expressed in a nested-structure, document-specific markup language and the query further comprises: links that are associated with join conditions that define relationships among the query nodes as being children, parents, ancestors or descendants of each other; and
   a query root node that represents answers to be returned.

3. The apparatus of claim 2, wherein the nested-structure, document-specific markup language is extensible markup language.

4. The apparatus of claim 2, wherein the answers include a complete answer to an original, non-relaxed query, satisfying all requirements of the original query.

5. The apparatus of claim 2, wherein the original query is expressed as an original query tree, the relaxed query is expressed as a relaxed query tree, the relaxing includes removing from the original query, a requirement that a leaf node must be found in the input document, and the relaxing includes preserving a shape of the original query tree while forming the relaxed query tree to have no more nodes than the original query tree.

6. The apparatus of claim 2, wherein the original query is expressed as an original query tree, the relaxed query is expressed as a relaxed query tree, the relaxing includes removing from the original query, a requirement, in a relationship between an ancestor node and a descendant node, that an intermediate node between the ancestor node and the descendant node be included in the relationship, and relaxing includes preserving a shape of the original query tree while forming the relaxed query tree to have no more nodes than the original query tree.

7. The apparatus of claim 2, wherein the original query is expressed as an original query tree, the relaxed query is expressed as a relaxed query tree, the relaxing includes replacing in the original query, a child relationship between an ancestor node and a descendant node by a descendant relationship between the two nodes, and the relaxing includes preserving a shape of the original query tree while forming the relaxed query tree to have no more nodes than the original query tree.

8. A tangible computer readable medium storing computer program instructions for adaptively evaluating a query with respect to a document that is expressed in a nested-structure, document-specific markup language, which when executed on a processor, cause the processor to perform operations comprising:
   relaxing an original query to form a relaxed query, the original query comprising a tree structure having a plurality of query nodes;
   based on the relaxed query, forming a plurality of servers, each server corresponding to a respective query node in the tree structure and having a respective server queue configured to store candidate answers that constitute one of partial answers and final answers;
   processing the candidate answers in the server queues by operations including:
   adaptively choosing a winning server, from the plurality of servers, that is likely to produce fewest candidate answers after pruning against a top-k set and to whose queue a current candidate answer should be sent;
   sending the current candidate answer to the winning server's queue;
   adaptively choosing a next candidate answer to process from among candidate answers in the winning server's queue by selecting an answer with a maximum possible next score, the maximum possible next score determined by adding a current score of the answer to a maximum possible score the answer could receive from its current server;

computing a join between the current candidate answer and next candidate answers at the winning server, so as to produce a new current candidate answer; and updating the top-k set with the new current candidate answer only if a score of the new current candidate answer exceeds a score of a top-k answer in a top-k set; and providing the top-k set as an evaluation of the top-k query;

wherein the candidate answers include fragments of the document that are less than the entire document and the score of each candidate answer is calculated by calculating scores of progressively smaller fragments of the query that are matched by each candidate answer to be correspondingly smaller scores, the candidate answers including a complete answer to the relaxed query and satisfying all requirements of the relaxed query but satisfying less than all requirements of the original query.

9. The computer readable medium of claim 1, wherein, the document is expressed in a nested-structure, document-specific markup language and the query further comprises:

links that are associated with join conditions that define relationships among the query nodes as being children, parents, ancestors or descendants of each other; and a query root node that represents answers to be returned.

10. The computer readable medium of claim 2, wherein the nested-structure, document-specific markup language is extensible markup language.

11. The computer readable medium of claim 2, wherein the answers include a complete answer to an original, non-relaxed query, satisfying all requirements of the original query.

12. The computer readable medium of claim 2, wherein the original query is expressed as an original query tree, the relaxed query is expressed as a relaxed query tree, the relaxing includes removing from the original query, a requirement that a leaf node must be found in the input document, and the relaxing includes preserving a shape of the original query tree while forming the relaxed query tree to have no more nodes than the original query tree.

13. The computer readable medium of claim 2, wherein the original query is expressed as an original query tree, the relaxed query is expressed as a relaxed query tree, the relaxing includes removing from the original query, a requirement, in a relationship between an ancestor node and a descendant node, that an intermediate node between the ancestor node and the descendant node be included in the relationship, and relaxing includes preserving a shape of the original query tree while forming the relaxed query tree to have no more nodes than the original query tree.

14. The computer readable medium of claim 2, wherein the original query is expressed as an original query tree, the relaxed query is expressed as a relaxed query tree, the relaxing includes replacing in the original query, a child relationship between an ancestor node and a descendant node by a descendant relationship between the two nodes, and the relaxing includes preserving a shape of the original query tree while forming the relaxed query tree to have no more nodes than the original query tree.

15. An apparatus for adaptively evaluating a query with respect to a document that is expressed in a nested-structure, document-specific markup language, the apparatus comprising:

a processor;

a memory to store computer program instructions, the computer program instructions when executed on the processor cause the processor to perform operations comprising:

receiving an original query that is expressed as a tree having a degree $d \geq 3$, the tree including query nodes and links that define relationships among the query nodes as being parents, children, ancestors or descendants of each other;

relaxing the original query to form a relaxed query;

calculating scores for respective candidate answers that include one of partial answers and final answers, the candidate answers including a complete answer to the relaxed query and satisfying all requirements of the relaxed query but satisfying less than all requirements of the original query, a score including:

a first portion determined by how many children or descendants a first node has, that are at a given level beneath the first node and that satisfy a first query requirement for that given level; and a second portion determined by what fraction of all a second node's children or descendants at a predetermined level, satisfy a second query requirement for that second node; and applying the scores to govern a processing order of the candidate answers to arrive at an evaluation of the query wherein the score is directly proportional to a mathematical product of the first portion and the second portion, the candidate answers include fragments of the document that are less than the entire document, and a next candidate answer to process from among the candidate answers is chosen by selecting an answer with a maximum possible next score, the maximum possible next score determined by adding a current score of the answer to a maximum possible score the answer could receive from its current server;

the calculating further comprising:

calculating scores for respective candidate answers comprises calculating scores of progressively smaller fragments of the query that are matched by a candidate answer to be correspondingly smaller scores.

16. The apparatus of claim 15, wherein the nested-structure, document-specific markup language is extensible markup language.

17. The apparatus of claim 15, wherein the answers include a complete answer to an original, non-relaxed query, satisfying all requirements of the original query.

18. The apparatus of claim 15, wherein the original query is expressed as an original query tree, the relaxed query is expressed as a relaxed query tree, the relaxing includes removing from the original query, a requirement that a leaf node must be found in the input document, and the relaxing includes preserving a shape of the original query tree while forming the relaxed query tree to have no more nodes than the original query tree.

19. The apparatus of claim 15, wherein the original query is expressed as an original query tree, the relaxed query is expressed as a relaxed query tree, the relaxing includes removing from the original query, a requirement, in a relationship between an ancestor node and a descendant node, that an intermediate node between the ancestor node and the descendant node be included in the relationship, and relaxing includes preserving a shape of the original query tree while forming the relaxed query tree to have no more nodes than the original query tree.

20. The apparatus of claim 15, wherein the original query is expressed as an original query tree, the relaxed query is expressed as a relaxed query tree, the relaxing includes replacing in the original query, a child relationship between an ancestor node and a descendant node by a descendant relationship between the two nodes, and the relaxing includes preserving a shape of the original query tree while forming the relaxed query tree to have no more nodes than the original query tree.

* * * * *